United States Patent
Huang et al.

(10) Patent No.: US 11,473,327 B2
(45) Date of Patent: Oct. 18, 2022

(54) AUTOMATED POOL CLEANER WITH ENHANCED TRAVEL FEATURES

(71) Applicant: Intex Marketing Ltd., Tortola (VG)

(72) Inventors: Zhi Xiong Huang, Fujian (CN); Wen Xiao Zhang, Fujian (CN); Yaw Yuan Hsu, Fujian (CN)

(73) Assignee: Intex Marketing Ltd., Tortola (VG)

( * ) Notice: Subject to any disclaimer, the term of this patent is extended or adjusted under 35 U.S.C. 154(b) by 211 days.

(21) Appl. No.: 16/823,941

(22) PCT Filed: Sep. 19, 2018

(86) PCT No.: PCT/IB2018/057229
§ 371 (c)(1),
(2) Date: Mar. 19, 2020

(87) PCT Pub. No.: WO2019/058286
PCT Pub. Date: Mar. 28, 2019

(65) Prior Publication Data
US 2020/0299986 A1    Sep. 24, 2020

(30) Foreign Application Priority Data

Sep. 19, 2017  (CN) .......................... 201710846868.7
Sep. 19, 2017  (CN) .......................... 201721201178.8
(Continued)

(51) Int. Cl.
*E04H 4/16*     (2006.01)
*F16H 1/20*     (2006.01)

(52) U.S. Cl.
CPC .......... *E04H 4/1663* (2013.01); *E04H 4/1654* (2013.01); *E04H 4/1672* (2013.01); *F16H 1/206* (2013.01)

(58) Field of Classification Search
CPC ........ E04H 4/16; E04H 4/1636; E04H 4/1654
See application file for complete search history.

(56) References Cited

U.S. PATENT DOCUMENTS 2,923,954 A    2/1960  Na
5,197,158 A    3/1993  Moini
(Continued)

FOREIGN PATENT DOCUMENTS

CN    101033650    9/2007
CN    102943576    2/2013
(Continued)

OTHER PUBLICATIONS

International Search Report and Written Opinion as issued by the International Search Report, dated Jan. 21, 2019, for International Patent Application No. PCT/IB2018/057229; 10 pages.
(Continued)

*Primary Examiner* — Michael D Jennings
(74) *Attorney, Agent, or Firm* — Faegre Drinker Biddle & Reath LLP

(57) ABSTRACT

A pool cleaner for use in a pool may include a housing, a driving assembly, a traction assembly, and a filtration assembly. The driving assembly may include an inlet conduit configured to receive pressurized water, an impeller in fluid communication with the inlet conduit, an outlet conduit in fluid communication with the impeller, and an outlet nozzle coupled to the outlet conduit and may be configured to eject the pressurized water upward from the housing and into the pool in a parallel or oblique ejection direction relative to a vertical axis. The traction assembly may be coupled to the impeller to drive the housing across the pool and the filtration assembly may be configured to filter water from the pool.

25 Claims, 30 Drawing Sheets

(30) Foreign Application Priority Data

| Nov. 20, 2017 | (CN) | ............................ | 201711157603.2 |
| Nov. 20, 2017 | (CN) | ............................ | 201721553244.8 |
| Apr. 27, 2018 | (CN) | ............................ | 201820623844.5 |

(56) References Cited

U.S. PATENT DOCUMENTS

| 10,435,903 B2* | 10/2019 | Hui |
| 2011/0088725 A1 | 4/2011 | Bruneel |
| 2014/0259464 A1 | 9/2014 | Renaud |

FOREIGN PATENT DOCUMENTS

| CN | 203640340 | 6/2014 |
| CN | 107700885 | 2/2018 |
| CN | 107762195 | 3/2018 |
| CN | 207245267 | 4/2018 |
| CN | 207526181 | 6/2018 |
| DE | 202011051889 U1 | 1/2012 |
| WO | 2019/058286 | 3/2019 |

OTHER PUBLICATIONS

International Preliminary Report on Patentability as issued by The International Bureau of WIPO, dated Mar. 24, 2020, for International Patent Application No. PCT/IB2018/057229; 6 pages.

* cited by examiner

AUTOMATED POOL CLEANER WITH ENHANCED TRAVEL FEATURES

CROSS REFERENCE TO RELATED APPLICATIONS

This application is a U.S. national stage application of International Patent Application No. PCT/IB2018/057229, filed Sep. 19, 2018, which claims priority to the following Chinese patent applications under 35 U.S.C. § 119(b), the disclosures of which are hereby expressly incorporated by reference herein in their entirety:

| Chinese Application Number | Filing Date |
| --- | --- |
| 201721201178.8 | Sep. 19, 2017 |
| 201710846868.7 | Sep. 19, 2017 |
| 201711157603.2 | Nov. 20, 2017 |
| 201721553244.8 | Nov. 20, 2017 |
| 201820623844.5 | Apr. 27, 2018 |

FIELD OF THE DISCLOSURE

The present disclosure relates to a pool cleaner and a method of using the same to clean a pool.

BACKGROUND OF THE DISCLOSURE

A pool requires frequent cleaning to remove dirt and other debris. Manual cleaning is time consuming and inconvenient. Automated pool cleaners are available. However, such automated pool cleaners may be expensive, may be unable to reach all surfaces of the pool (e.g., vertical side walls of the pool), and may become trapped in corners of the pool. Also, it may be difficult to empty debris from such automated pool cleaners between uses.

SUMMARY

The present disclosure provides a pool cleaner having enhanced travel features, such as enhanced traction, enhanced propulsion, enhanced steering, enhanced directional control, and/or enhanced power assistance when traveling across a pool.

According to an embodiment of the present disclosure, a pool cleaner is disclosed for use in a pool containing water and having a pump. The pool cleaner has a longitudinal axis, a transverse axis, and a vertical axis and includes a housing, a driving assembly including an inlet conduit configured to receive pressurized water from the pump, an impeller in fluid communication with the inlet conduit, an outlet conduit in fluid communication with the impeller, and an outlet nozzle coupled to the outlet conduit and configured to eject pressurized water upward from the housing and into the pool in a parallel or oblique ejection direction relative to the vertical axis, at least one traction assembly coupled to the impeller to drive the housing across the pool, and a filtration assembly disposed in the housing and configured to filter water from the pool.

In certain embodiments, the pool cleaner further includes an inlet connector coupled to the inlet conduit, the inlet connector configured to connect to a flexible hose that extends from the pump and into the pool.

In certain embodiments, the ejection direction includes an upward component that extends upward from the housing and a rearward component that extends rearward from the housing, the upward component generating a downward adhesion force and the rearward component generating a forward propulsion force.

In certain embodiments, the outlet nozzle is rotatable relative to the housing between a first position in which the ejection direction extends toward a rear side of the housing, a second position in which the ejection direction extends toward a right side of the housing to steer the housing left, and a third position in which the ejection direction extends toward a left side of the housing to steer the housing right.

In certain embodiments, the outlet nozzle has a bent shape.

In certain embodiments, the outlet nozzle includes a first portion that ejects pressurized water in a parallel ejection direction relative to the vertical axis, a second portion that ejects pressurized water in an oblique ejection direction relative to the vertical axis, and an internal wall separating the first and second portions.

In certain embodiments, the oblique ejection direction forms an oblique angle relative to the vertical axis, the oblique angle being greater than 0 degrees and less than or equal to about 45 degrees.

In certain embodiments, the pool cleaner further includes a weight coupled to the outlet nozzle opposite the ejection direction.

In certain embodiments, the housing includes an upper housing and a lower housing, the upper housing defining an inlet opening that accommodates an inlet connector to the inlet conduit and an outlet opening that accommodates the outlet nozzle from the outlet conduit. The lower housing may define a suction inlet in fluid communication with the filtration assembly.

In certain embodiments, the pool cleaner further includes a transmission assembly operatively coupled to the impeller and the at least one traction assembly, the transmission assembly having a first configuration that drives the at least one traction assembly rearward, and a second configuration that drives the at least one traction assembly forward.

In certain embodiments, the at least one traction assembly includes a right traction assembly having a right steering projection that projects from a right side of the pool cleaner, and a left traction assembly having a left steering projection that projects from a left side of the pool cleaner.

According to another embodiment of the present disclosure, a pool cleaner is disclosed for use in a pool containing water. The pool cleaner includes a housing, a driving assembly, a transmission assembly including a first gear coupled to the driving assembly, a second gear rotatable in an opposite direction than the first gear, an idler gear moveable between a first configuration in which the idler gear meshes with the first gear and a second configuration in which the idler gear meshes with the second gear, and a driven gear that meshes with the idler gear in the first and second configurations, at least one traction assembly coupled to the driven gear of the transmission assembly to drive the housing in a first direction in the first configuration and a second direction in the second configuration, and a filtration assembly disposed in the housing and configured to filter water from the pool.

In certain embodiments, the transmission assembly further includes a control gear with a guide track, and a support structure coupled to the idler gear, the support structure including a guide pin that travels repeatedly through the guide track to reciprocate the idler gear between the first and second configurations.

In certain embodiments, the transmission assembly further includes a shaft coupled between the driven gear and the at least one traction assembly, and a support structure coupled to the idler gear, the support structure rotating about the shaft to move the idler gear between the first and second configurations.

In certain embodiments, the idler gear has a first circumferential position relative to the driven gear in the first configuration, and a second circumferential position relative to the driven gear in the second configuration.

In certain embodiments, the first direction is a reverse direction and the second direction is a forward direction.

In certain embodiments, the inlet conduit extends vertically downward through the housing, and the outlet conduit extends vertically upward through the housing.

In certain embodiments, the pool cleaner further includes an outlet nozzle coupled to the outlet conduit and configured to eject pressurized water upward from the housing and into the pool in a parallel or oblique ejection direction relative to a vertical axis.

In certain embodiments, the pool cleaner further includes a first floating body moveably coupled to a left side of the housing and a second floating body moveably coupled to a right side of the housing, the first and second floating bodies configured to move asymmetrically relative to a longitudinal axis of the pool cleaner.

According to yet another embodiment of the present disclosure, a pool cleaner is disclosed for use in a pool containing water and having a pump. The pool cleaner has a longitudinal axis, a transverse axis, and a vertical axis. The pool cleaner includes a housing, a driving assembly including an inlet conduit configured to receive pressurized water from the pump, an impeller in fluid communication with the inlet conduit, an outlet conduit in fluid communication with the impeller, and an outlet nozzle coupled to the outlet conduit and configured to eject pressurized water in a vertically upward ejection direction from the housing and into the pool, a transmission assembly including a gearset operable in a first configuration and a second configuration, at least one traction assembly coupled to the transmission assembly to drive the housing in a first direction when the gearset is in the first configuration and a second direction when the gearset is in the second configuration, and a filtration assembly disposed in the housing and configured to filter water from the pool.

In certain embodiments, the ejection direction further includes a rearward component that extends rearward from the housing, the vertically upward component generating a downward adhesion force and the rearward component generating a forward propulsion force.

According to still yet another embodiment of the present disclosure, a pool cleaner is disclosed for use in a pool containing water. The pool cleaner has a longitudinal axis, a transverse axis, and a vertical axis. The pool cleaner includes a housing having a left side and a right side, the longitudinal axis of the pool cleaner extending between the left and right sides of the housing, a driving assembly, a transmission assembly coupled to the driving assembly, a left traction assembly coupled to the transmission assembly to drive the housing across the pool, a right traction assembly coupled to the transmission assembly to drive the housing across the pool, a filtration assembly disposed in the housing and configured to filter water from the pool, a left floating body moveably coupled to the left side of the housing, and a right floating body moveably coupled to the right side of the housing, wherein the left and right floating bodies are configured to move asymmetrically relative to the longitudinal axis of the pool cleaner.

In certain embodiments, the driving assembly includes an inlet conduit configured to receive pressurized water from a pump disposed externally of the pool, an impeller in fluid communication with the inlet conduit, an outlet conduit in fluid communication with the impeller, and an outlet nozzle coupled to the outlet conduit and configured to eject pressurized water in a vertically upward ejection direction from the housing and into the pool.

In certain embodiments, the transmission assembly includes a first gear coupled to the driving assembly, a second gear rotatable in an opposite direction than the first gear, an idler gear moveable between a first configuration in which the idler gear meshes with the first gear and a second configuration in which the idler gear meshes with the second gear, and a driven gear that meshes with the idler gear in the first and second configurations.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

1. Automated Pool Cleaner

Figure 1:
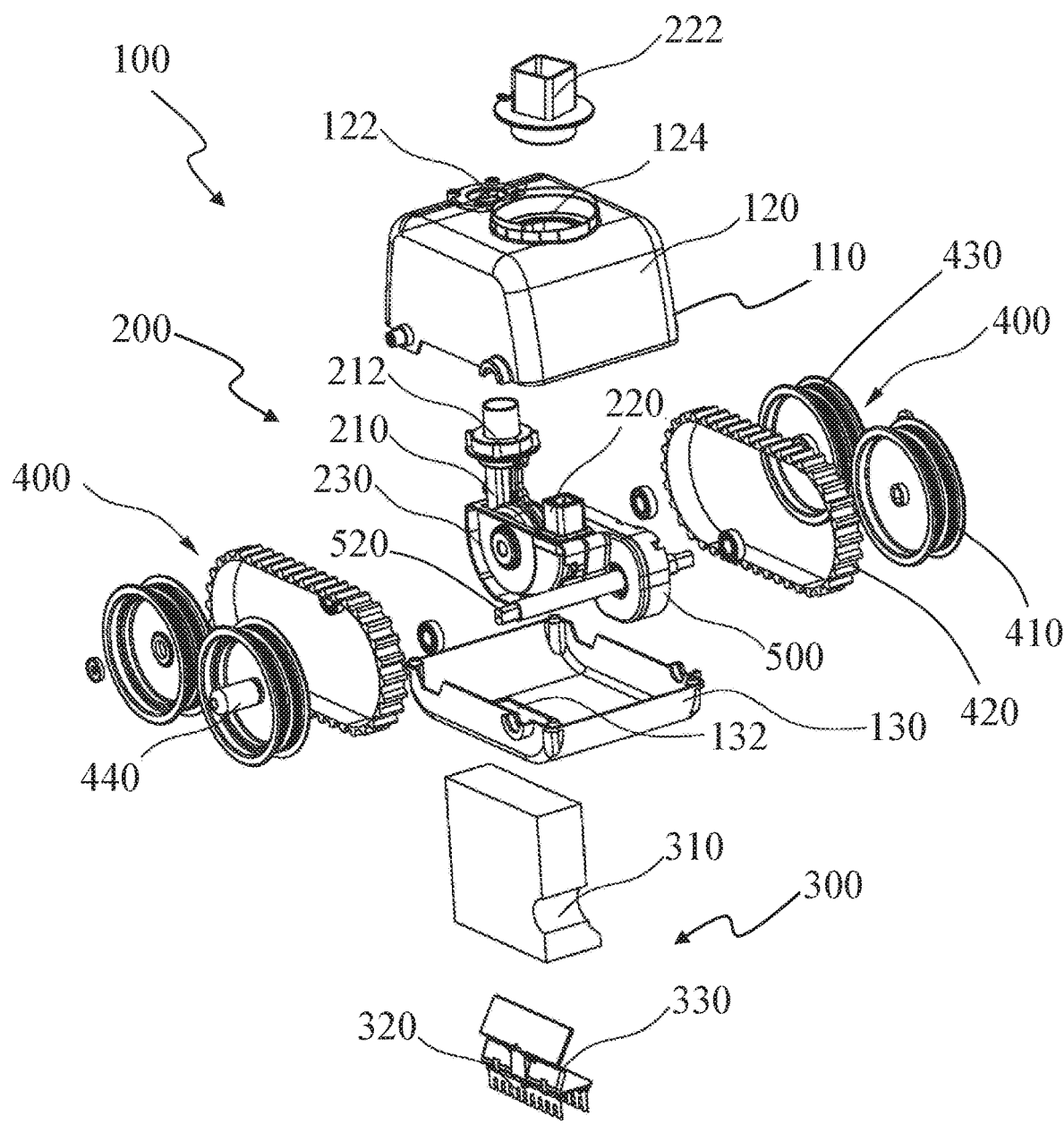
FIG. 1 is an exploded perspective view of a first automated pool cleaner of the present disclosure.
Figure 2:
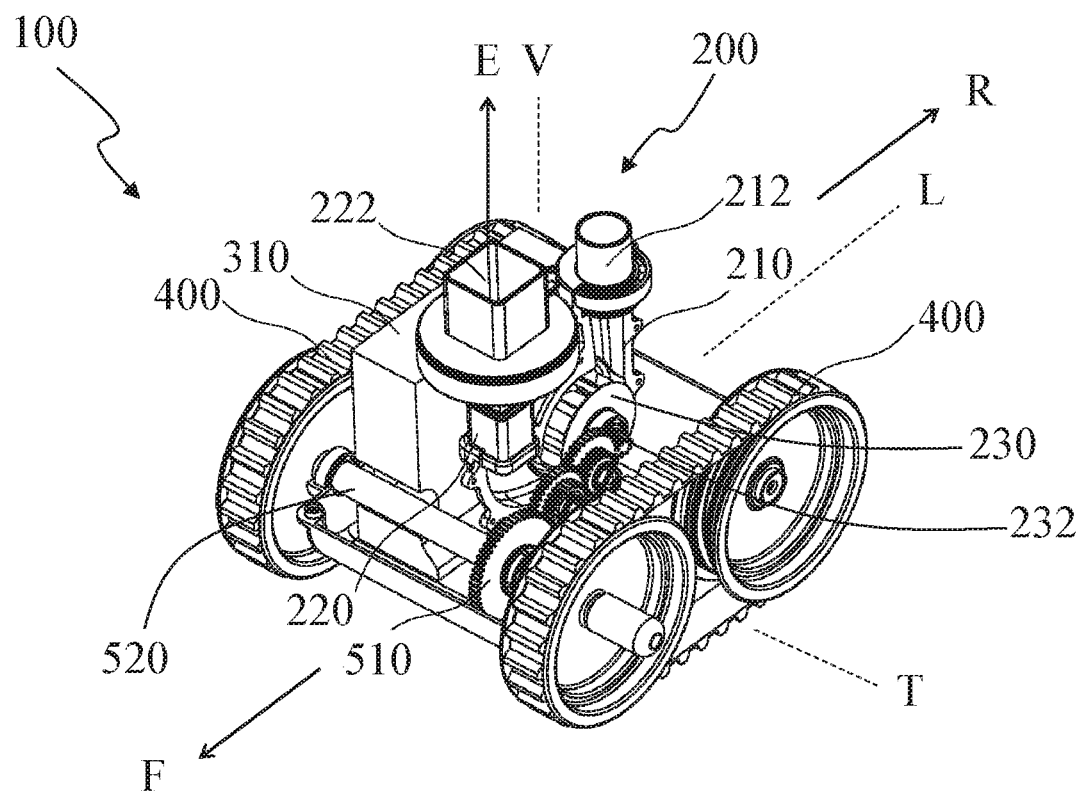
FIG. 2 is an assembled perspective view of the first pool cleaner, wherein a housing is removed to show internal components of the first pool cleaner.
Figure 3:
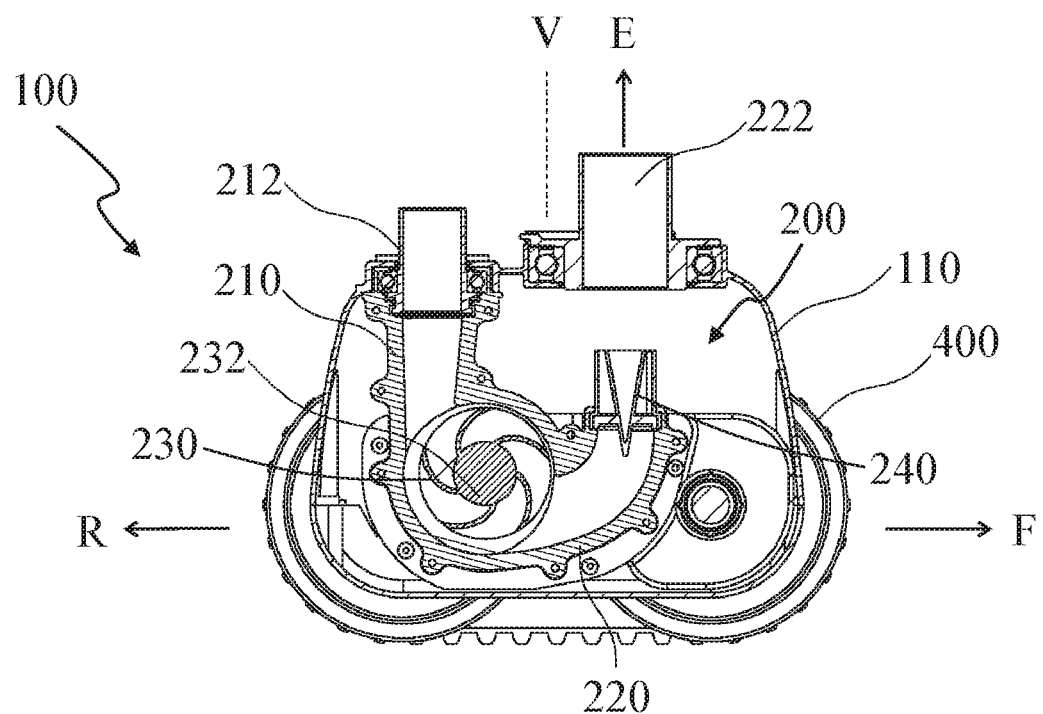
FIG. 3 is a cross-sectional view of the first pool cleaner.
Figure 4:
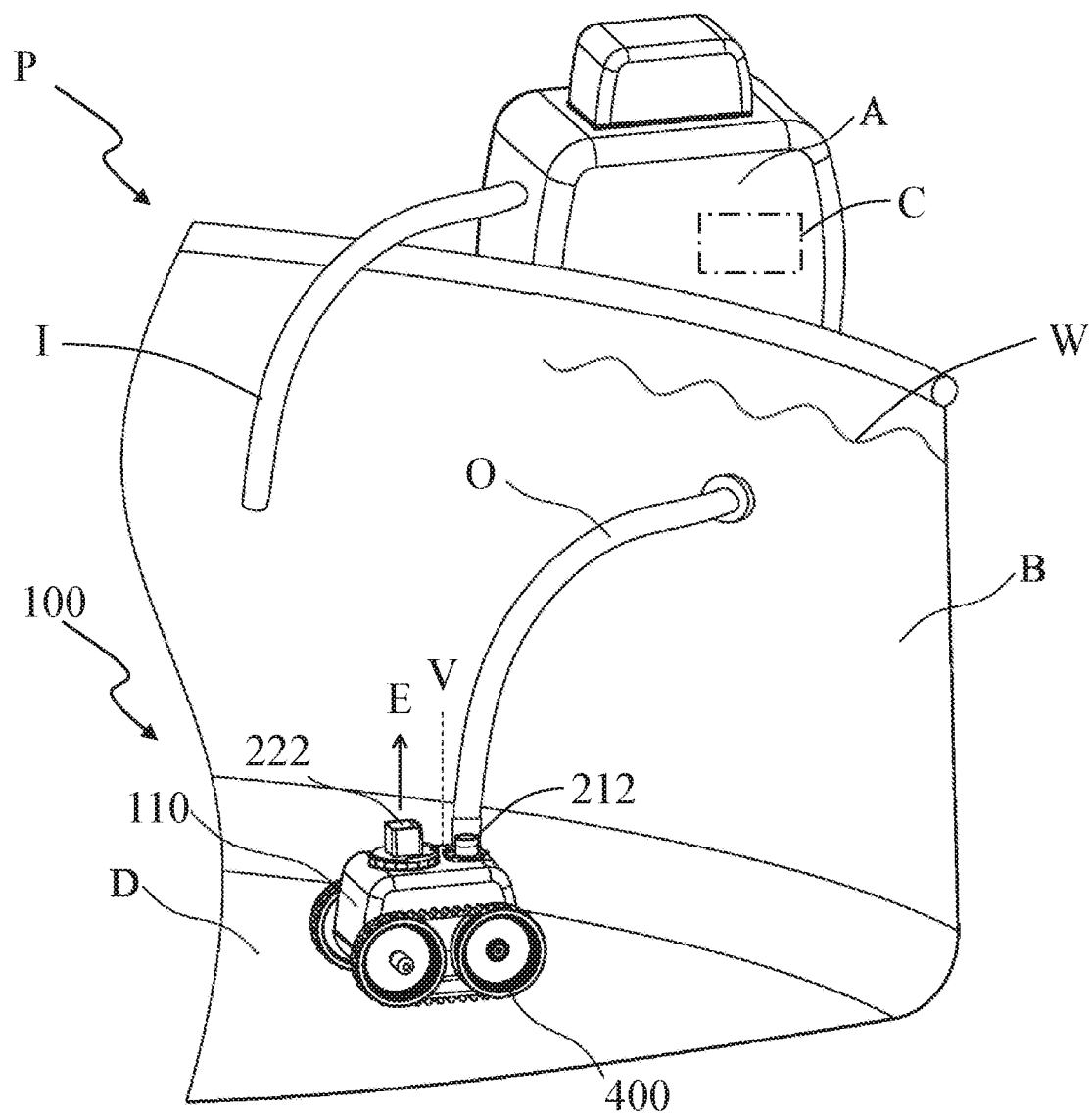
FIG. 4 is a perspective view of the first pool cleaner traveling across a floor of a pool.
Figure 5:
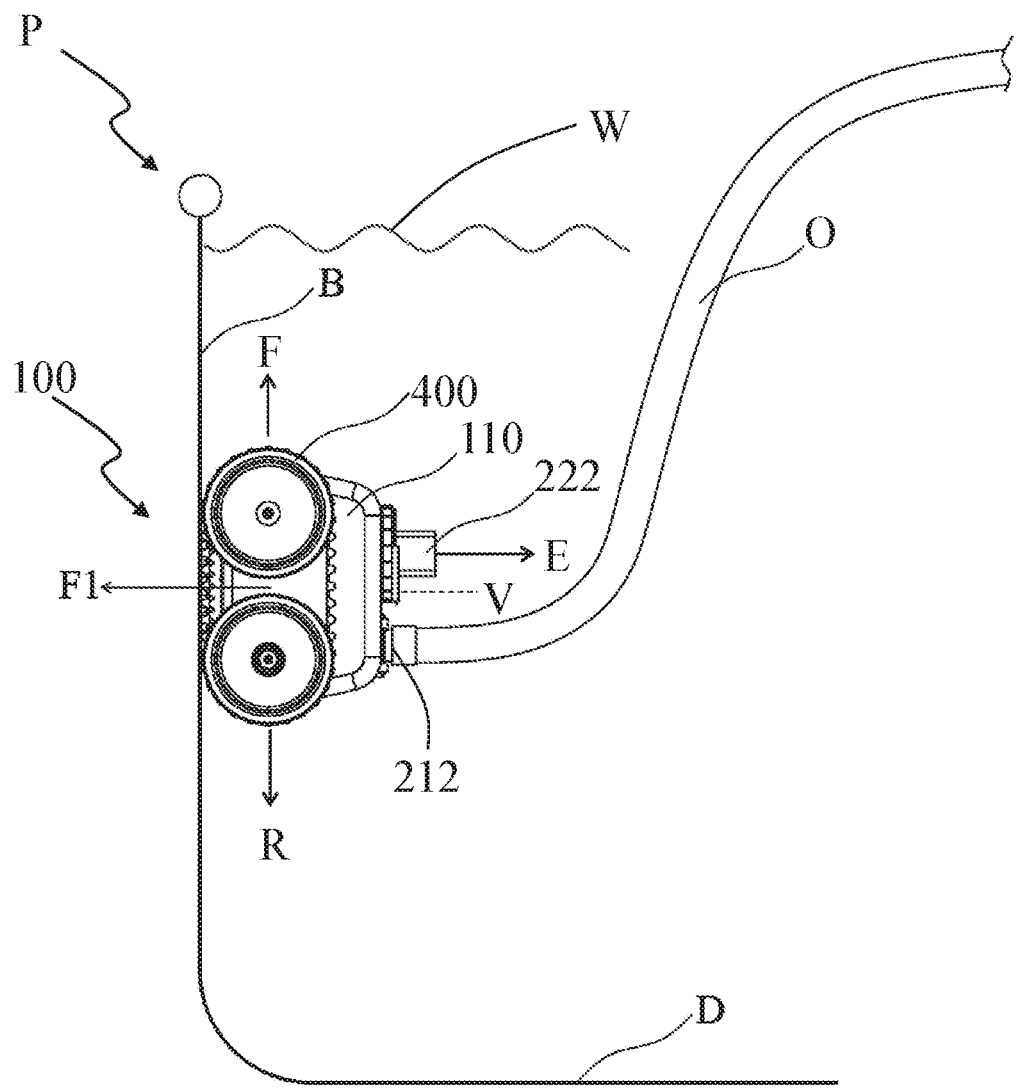
FIG. 5 is a side elevational view of the first pool cleaner traveling across a side wall of the pool.
Figure 6:
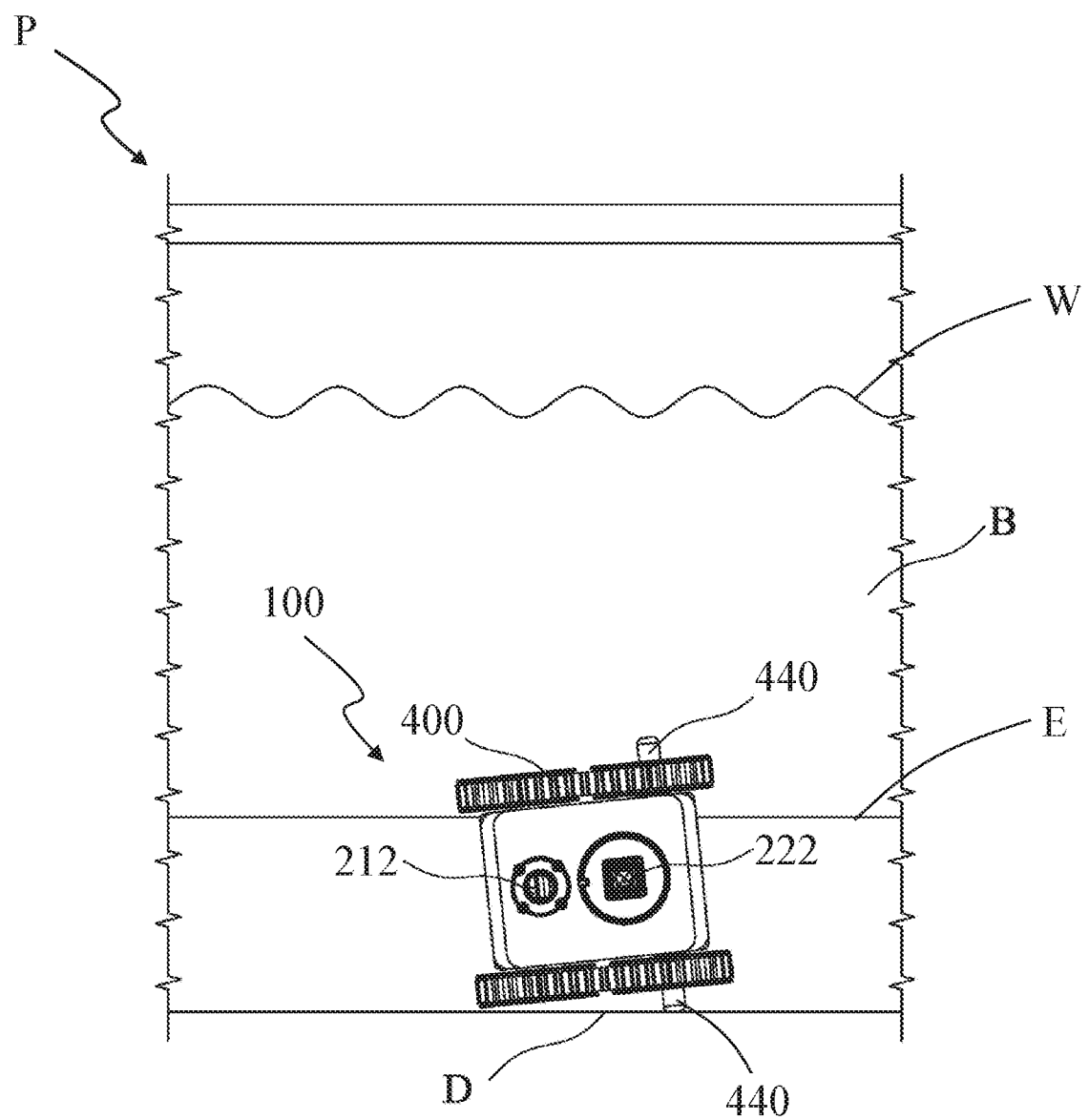
FIG. 6 is a top plan view of the first pool cleaner traveling along an edge of the pool.

A first automated pool cleaner 100 is shown in FIGS. 1-3 for use with a pool P (FIGS. 4-6). The illustrative pool cleaner 100 includes a housing 110, a hydraulic driving assembly 200 disposed within the housing 110, a filtration assembly 300 disposed within the housing 110, and one or more traction assemblies 400, illustratively left and right traction assemblies 400, and a transmission assembly 500 that operatively couples the hydraulic driving assembly 200 to the traction assemblies 400. Each component of the pool cleaner 100 is described further below.

As shown in FIG. 2, the illustrative pool cleaner 100 has a longitudinal axis L, a transverse axis T, and a vertical axis V. The longitudinal axis L is located between the left and right traction assemblies 400 and extends in a forward direction F and a rearward direction R of the pool cleaner 100. The transverse axis T is perpendicular to the longitudinal axis L and extends in a side-to-side direction of the pool cleaner 100. The vertical axis V is perpendicular to a plane containing the longitudinal axis L and the transverse axis T and extends in an upward-to-downward direction of the pool cleaner 100. These axes L, T, V are based on the pool cleaner 100 itself and move in space with the pool cleaner 100. For example, if the pool cleaner 100 is oriented upright on a horizontal surface, as shown in FIG. 4, the vertical axis V of the pool cleaner 100 extends vertically in space. But if the pool cleaner 100 is oriented sideways on a vertical surface, as shown in FIG. 5, the vertical axis V of the pool cleaner 100 extends horizontally in space.

The illustrative housing 110 of FIG. 1 includes an upper housing 120 that faces vertically upward and a lower housing 130 that faces vertically downward. The upper housing 120 and the lower housing 130 may be removably coupled together using screws, snaps, or other coupling mechanisms. The ability to separate the upper housing 120 and the lower housing 130 allows a user to access, repair, and/or replace the components disposed within the housing 110, such as the filtration assembly 300, and remove debris from the housing 110. The upper housing 120 defines an inlet opening 122 and an outlet opening 124, and the lower housing 130 defines a suction port 132. The housing 110 may also include shields (not shown) that cover and protect the traction assemblies 400.

The illustrative driving assembly 200 of FIGS. 1-3 includes an inlet conduit 210 with an inlet connector 212 and an outlet conduit 220 with an outlet nozzle 222. The inlet connector 212 is received in the inlet opening 122 of the upper housing 120, and the outlet conduit 220 is received in the outlet opening 124 of the upper housing 120. The driving assembly 200 also includes an impeller 230 positioned in fluid communication between the inlet conduit 210 and the outlet conduit 220. The impeller 230 and its output shaft 232 rotate when water is pumped from the inlet conduit 210 to the outlet conduit 220. The driving assembly 200 also includes a venturi nozzle 240 positioned along the outlet conduit 220. One exemplary driving assembly 200 is detailed in Section 2 below.

The illustrative filtration assembly 300 of FIG. 1 includes a filtration cartridge 310 (e.g., a screen filter) positioned in fluid communication between the suction port 132 and the outlet nozzle 222. The filtration assembly 300 also includes an agitator 320 (e.g., a brush, a scrubber, a wiper) coupled to the lower housing 130 adjacent to the suction port 132 and configured to agitate and direct debris into the suction port 132 and the filtration cartridge 310. The filtration assembly 300 also includes a check valve 330 that allows water and debris to enter the pool cleaner 100 through the suction port 132 but prevents water and debris from escaping from the pool cleaner 100 through the suction port 132.

Figure 7:
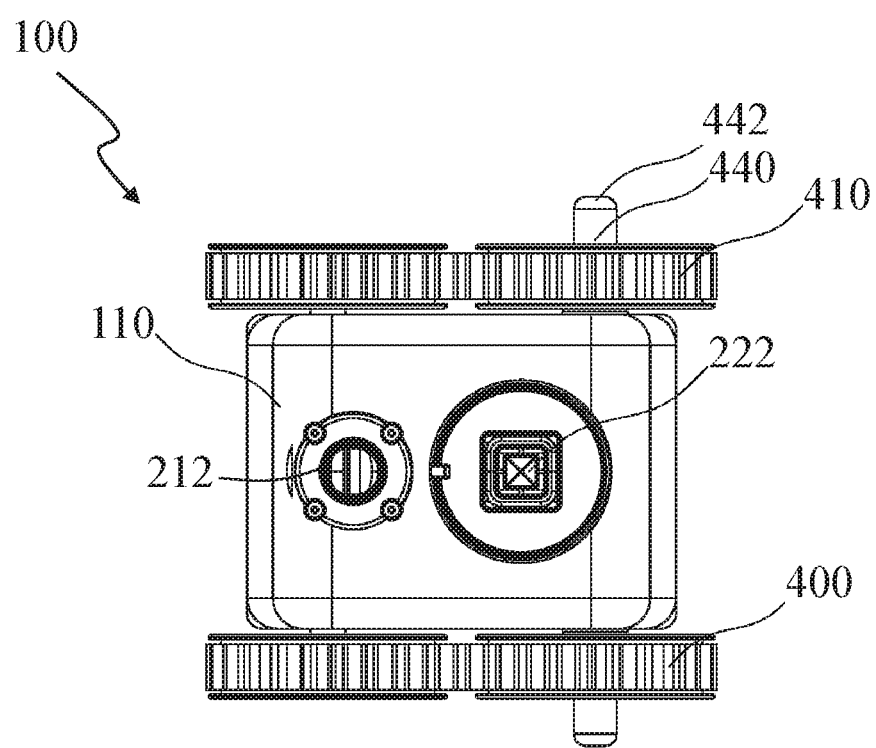
FIG. 7 is a top plan view of the first pool cleaner having a steering projection.
Figure 8:
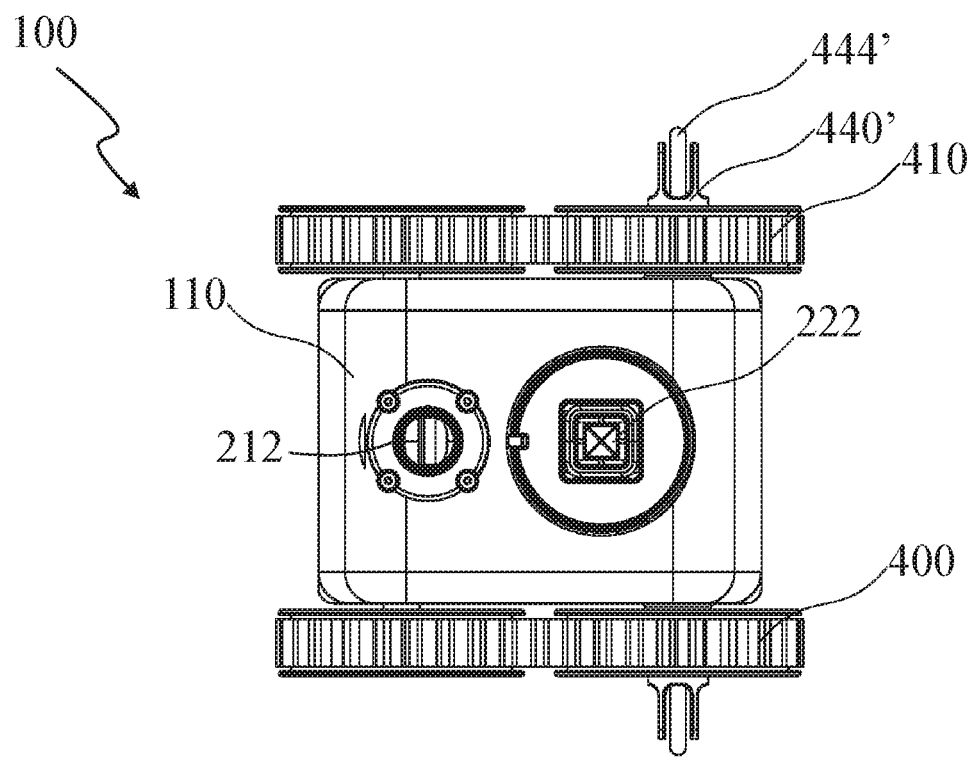
FIG. 8 is a top plan view of the first pool cleaner having another steering projection.
Figure 9:
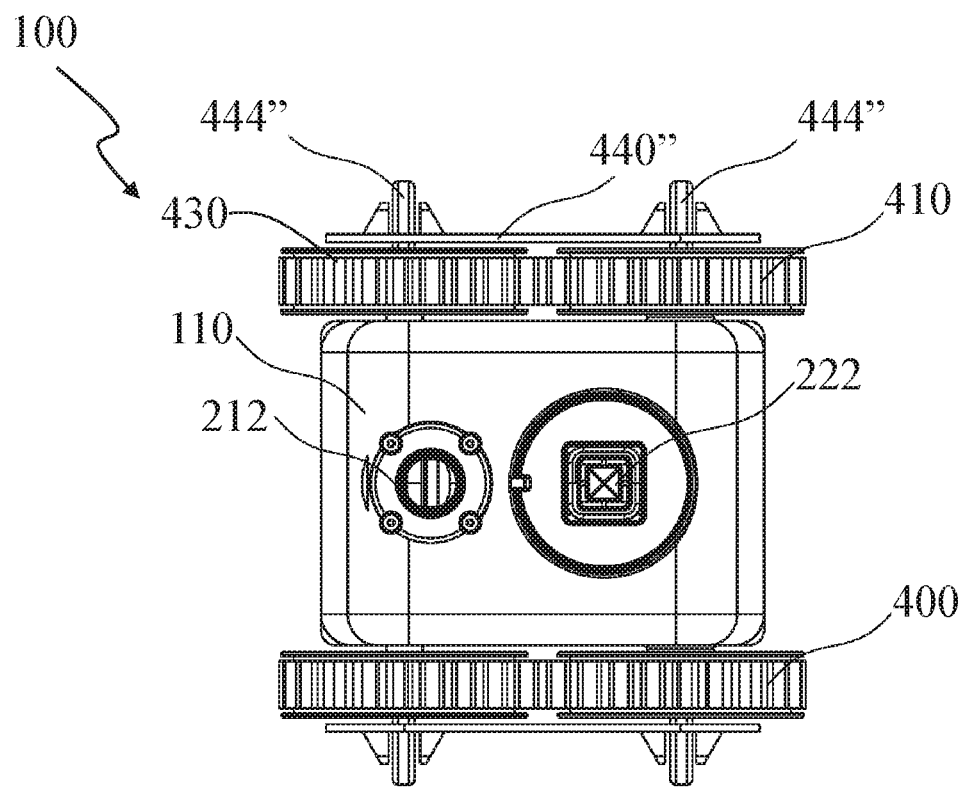
FIG. 9 is a top plan view of the first pool cleaner having another steering projection.

Each of the illustrative left and right traction assemblies 400 of FIGS. 1-3 includes a first wheel 410 driven by the transmission assembly 500, a track 420 driven by the first wheel 410, and a second wheel 430 driven by the track 420. The rotating track 420 may contact the pool P and drive the pool cleaner 100 in the forward direction F and, in some embodiments, the rearward direction R. Each traction assembly 400 may also include at least one steering projection 440 that projects sideways from the housing 110 in a direction parallel to the transverse axis T. As shown in FIG. 6, the steering projection 440 may contact the pool P and steer the pool cleaner 100 to prevent the pool cleaner 100 from becoming trapped along a corner or edge E of the pool P, for example. The steering projection 440 may be designed to travel smoothly across the pool P without damaging the pool P. In the illustrated embodiment of FIG. 7, steering projections 440 extend from each first wheel 410 to a smooth hemispherical head 442. In the illustrated embodiment of FIG. 8, steering projections 440' extend from each first wheel 410 to a smooth roller head 444'. In the illustrated embodiment of FIG. 9, steering projections 440" extend from each first wheel 410 and each second wheel 430 to smooth roller heads 444".

The illustrative transmission assembly 500 of FIGS. 1-3 includes a gearset 510 and a shaft 520. The gearset 510 is operatively coupled to the output shaft 232 of the impeller 230, and the shaft 520 is operatively coupled to the left and right first wheels 410. In this embodiment, the rotation of the impeller 230 is transferred to the gearset 510, to the shaft 520, and to the first wheels 410 to drive the pool cleaner 100 across the pool P in the forward direction F and, in some embodiments, the rearward direction R. One exemplary transmission assembly 500 is detailed in Section 3 below. Although a gearset 510 is shown and described herein, it is also within the scope of the present disclosure that the transmission assembly 500 may include a belt (not shown) between the shafts 232, 520.

The operation of the pool cleaner 100 will now be described with further reference to FIGS. 4-6. The pool P includes a floor D and a side wall B that cooperate to contain a body of water W. The pool P also includes a control unit A having an internal water pump C. The pool P may be an above-ground structure, and the control unit A may rest upon the ground externally of the pool P and separate from the pool cleaner 100. The control unit A receives water W from the pool P through a first conduit I (e.g., a rigid pipe or a flexible hose) and returns water W to the pool P through a second conduit O (e.g., a flexible hose). The control unit A may be configured to heat, filter, or otherwise treat the water W between the first conduit I and the second conduit O.

The pool cleaner 100 is configured to receive pressurized water from the control unit A during operation. More specifically, the inlet connector 212 of the pool cleaner 100 is configured to couple with the second conduit O to receive pressurized water from the pump C of the control unit A. Because of its flexible nature, the second conduit O is able to follow the pool cleaner 100 around the pool P. The pressurized water enters the inlet conduit 210 of the pool cleaner 100 via the inlet connector 212 and rotates the impeller 230 of the pool cleaner 100 to drive the traction assemblies 400 across the pool P. In FIG. 4, the pool cleaner 100 is shown traveling across the floor D of the pool P. In FIG. 5, the pool cleaner 100 is shown traveling across the side wall B of the pool P. In FIG. 6, the pool cleaner 100 is shown traveling across a corner or edge E of the pool P between the floor D and the side wall B.

As the pool cleaner 100 travels across the floor D and/or the side wall B of the pool P, the water flowing through the driving assembly 200 forms a negative pressure region in the housing 110, which pulls water and debris from the pool P into the filtration assembly 300. More specifically, the water and debris is pulled into the suction port 132 and through the filtration cartridge 310, which separates the debris from the filtered water. The separated debris may collect in the filtration cartridge 310 and/or the lower housing 130. The filtered water stream may mix with the water in the driving assembly 200 for combined ejection from the outlet nozzle 222 of the pool cleaner 100 and back into the pool P. In this way, the pool cleaner 100 serves as a vacuum cleaner for the pool P by cleaning the floor D and/or the side wall B of the pool P as it drives across those surfaces.

The pool cleaner 100 may be deactivated by turning off the control unit A. Without receiving pressurized water from the pump C of the control unit A, the pool cleaner 100 will no longer drive across or vacuum the pool P.

2. Exemplary Driving Assembly for Enhanced Traction, Propulsion, and/or Steering Referring still to the pool cleaner 100 of FIGS. 1-6, the driving assembly 200 may be designed to improve the travel of the pool cleaner 100 across the pool P. More specifically, an ejection direction E of water from the outlet nozzle 222 of the driving assembly 200 may be designed to improve the traction, propulsion, and/or steering of the pool cleaner 100 across the pool P.

As shown in FIGS. 3-5, the illustrative outlet nozzle 222 of the first pool cleaner 100 extends vertically upward from the upper housing 120 to eject water in a vertically upward ejection direction E, which is substantially parallel to the vertical axis V. The force of the water being ejected in the vertically upward ejection direction E creates an opposing, vertically downward adhesion force F1. This vertically downward adhesion force F1 extends toward the lower housing 130 and the adjacent floor D or side wall B of the pool P, which increases the traction between the pool cleaner 100 and the pool P. This increased traction may allow the pool cleaner 100 to grip and climb a vertical side wall B of the pool P, as shown in FIG. 5.

As the pool cleaner 100 continues to climb the side wall B of the pool P, the pool cleaner 100 may begin to exit the water W. However, the lack of water entering the pool cleaner 100 may reduce the force of the water ejected from the pool cleaner 100 along the ejection direction E and the corresponding adhesion force F1. The decreasing adhesion force F1 may cause the pool cleaner 100 to separate from the side wall B and sink to the floor D of the pool P for continued use.

Referring next to FIGS. 10-18, a second pool cleaner 1100 is shown. The second pool cleaner 1100 is similar to the first pool cleaner 100, except as described below. Like elements of the second pool cleaner 1100 are identified by adding "1000" to corresponding reference numerals of the first pool cleaner 100.

As shown in FIGS. 10-13, the illustrative outlet nozzle 1222 of the second pool cleaner 1100 is bent and extends obliquely upward and rearward from the upper housing 1120 to eject water in an obliquely upward and rearward ejection direction E. The oblique ejection direction E forms an oblique angle α relative to the vertical axis V. The oblique angle α between the oblique ejection direction E and the vertical axis V may be greater than 0 degrees and less than or equal to about 45 degrees, such as 5 degrees, 10 degrees, 15 degrees, 20 degrees, 25 degrees, 30 degrees, 35 degrees, 40 degrees, or 45 degrees.

The vertical force component of the water being ejected in the ejection direction E (i.e., the component of the ejection direction E that is parallel to the vertical axis V) creates an opposing, vertically downward adhesion force F1. This vertically downward adhesion force F1 extends toward the lower housing 1130 and the adjacent floor D or side wall B of the pool P. which increases the traction between the pool cleaner 100 and the pool P.

The rearward force component of the water being ejected in the ejection direction E creates an opposing, forward propulsion force F2. This forward propulsion force F2 extends along the longitudinal axis L in the forward direction F, which helps propel the pool cleaner 1100 across the pool P.

The outlet nozzle 1222 of the second pool cleaner 1100 may be configured to rotate relative to the upper housing 1120 to encourage the pool cleaner 1100 to turn during travel. Such turning may improve the coverage of the pool cleaner 1100 across the pool P.

As shown in FIGS. 10-13, the driving assembly 1200 includes a bearing 1250 disposed about the outlet opening 1124 of the upper housing 1120 to enable rotation of the outlet nozzle 1222 relative to the upper housing 1120. The outlet nozzle 1222 may rotate freely based on changing conditions inside and around the pool cleaner 1100. The driving assembly 1200 also includes a limit arm 1252 that extends from the outlet nozzle 1222 to limit rotation of the outlet nozzle 1222 within a pathway 1254 between opposing limit surfaces 1256 of the upper housing 1120. In the illustrated embodiment of FIG. 10, the pathway 1254 spans about 45 degrees leftward and rightward of the forward direction F between the limit surfaces 1256. The driving assembly 1200 further includes a weight 1258 coupled to the outlet nozzle 1222 opposite the ejection direction E for balance and stability.

The operation of the pool cleaner 1100 will now be described with reference to FIGS. 14-18.

Figure 14:
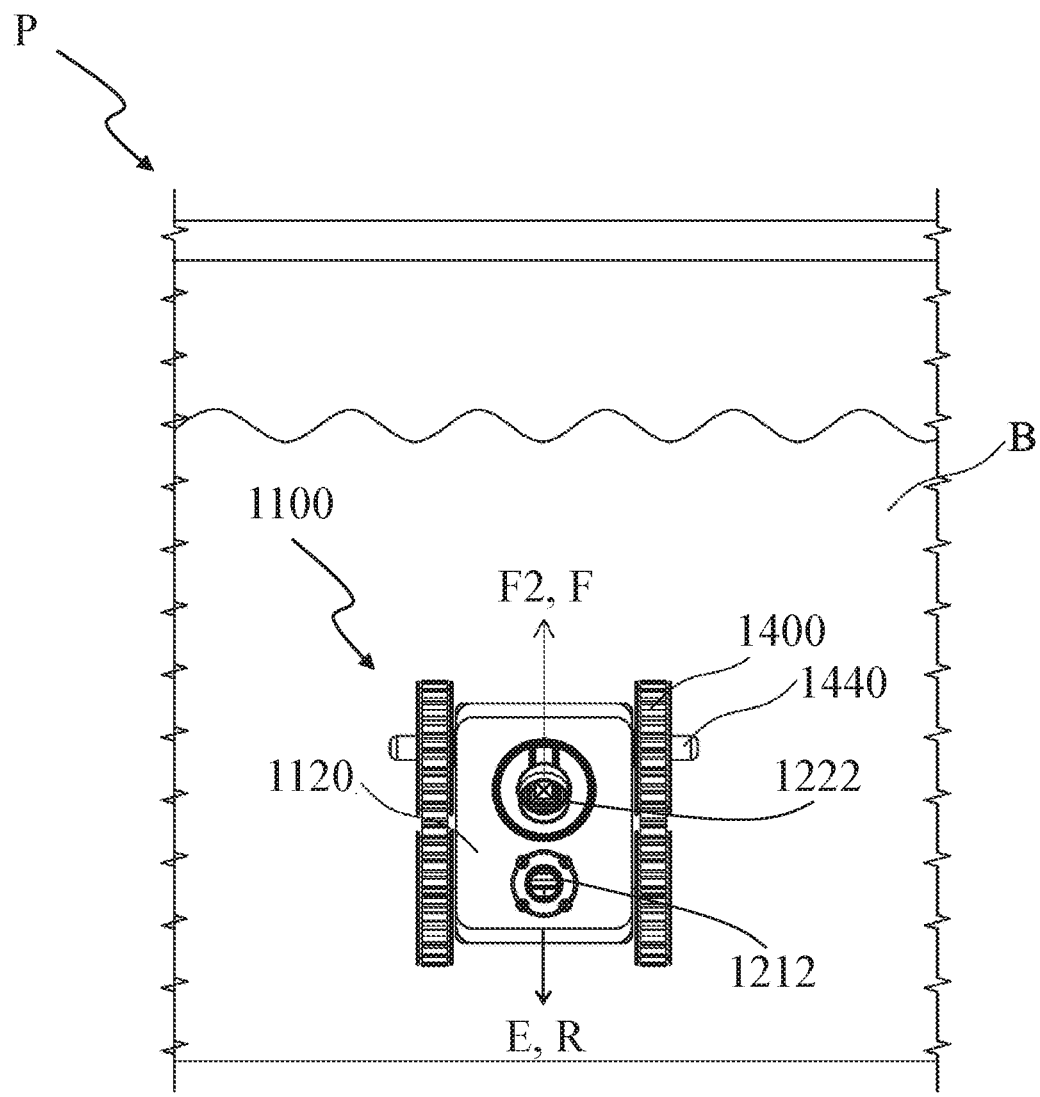
FIG. 14 is a top plan view of the second pool cleaner traveling in a straight-forward direction across the side wall of the pool.

In FIG. 14, the ejection direction E of the outlet nozzle 1222 is aligned with the rearward direction R. The opposing propulsion force F2 propels the pool cleaner 1100 in a straight-forward direction F.

Figure 10:
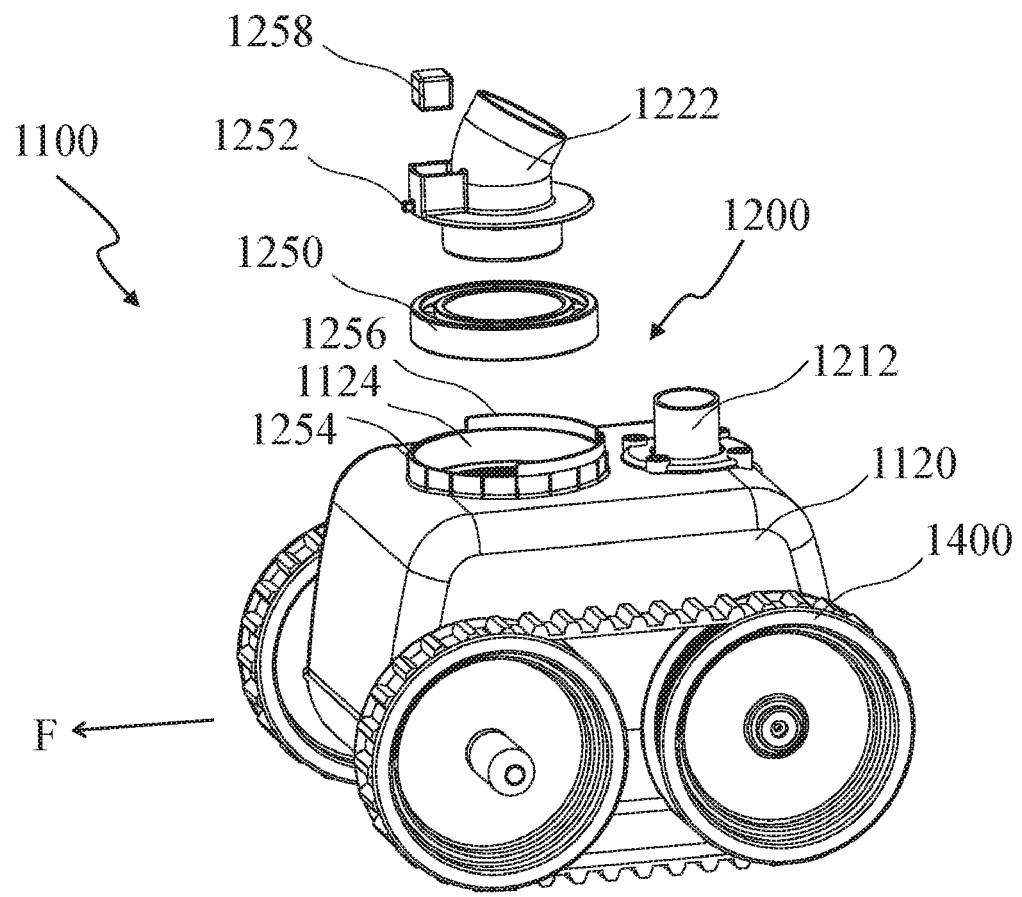
FIG. 10 is an exploded perspective view of a second automated pool cleaner of the present disclosure.
Figure 11:
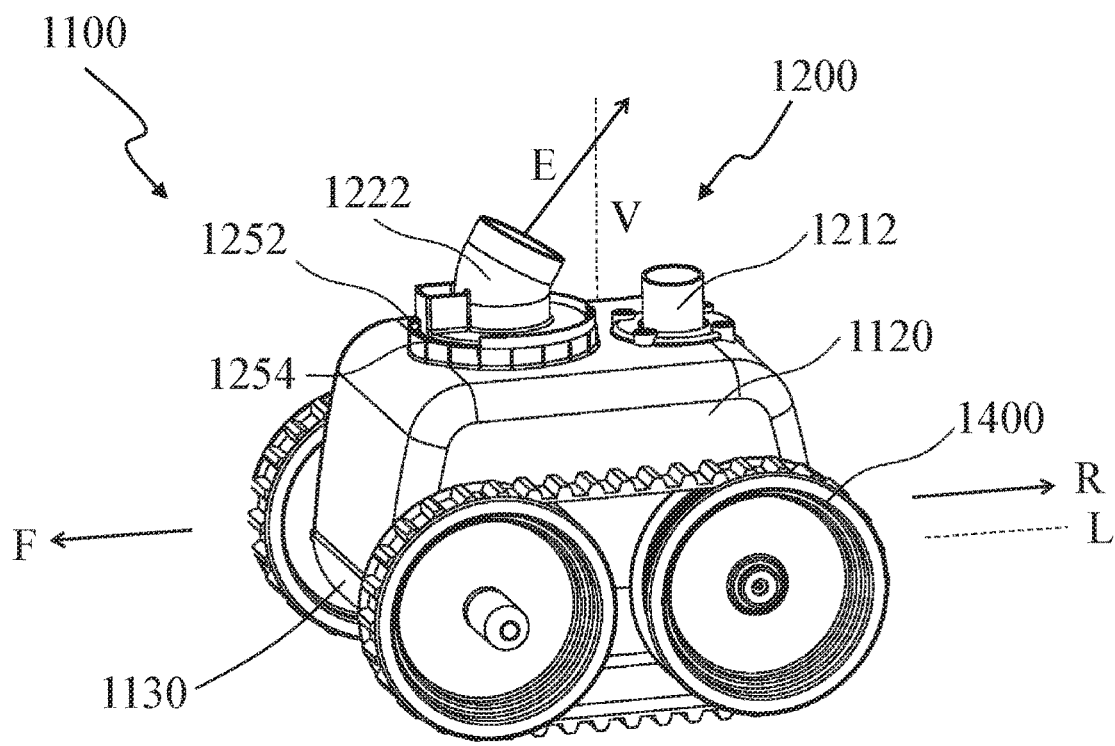
FIG. 11 is an assembled perspective view of the second pool cleaner.
Figure 12:
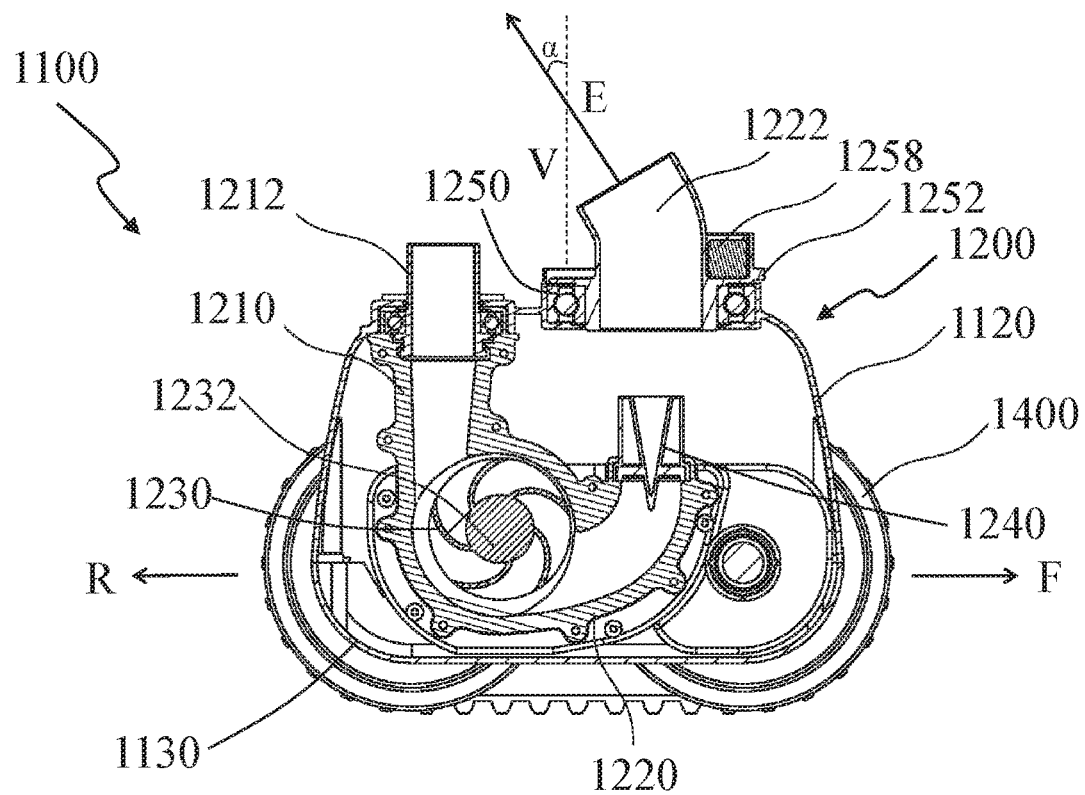
FIG. 12 is a cross-sectional view of the second pool cleaner.
Figure 13:
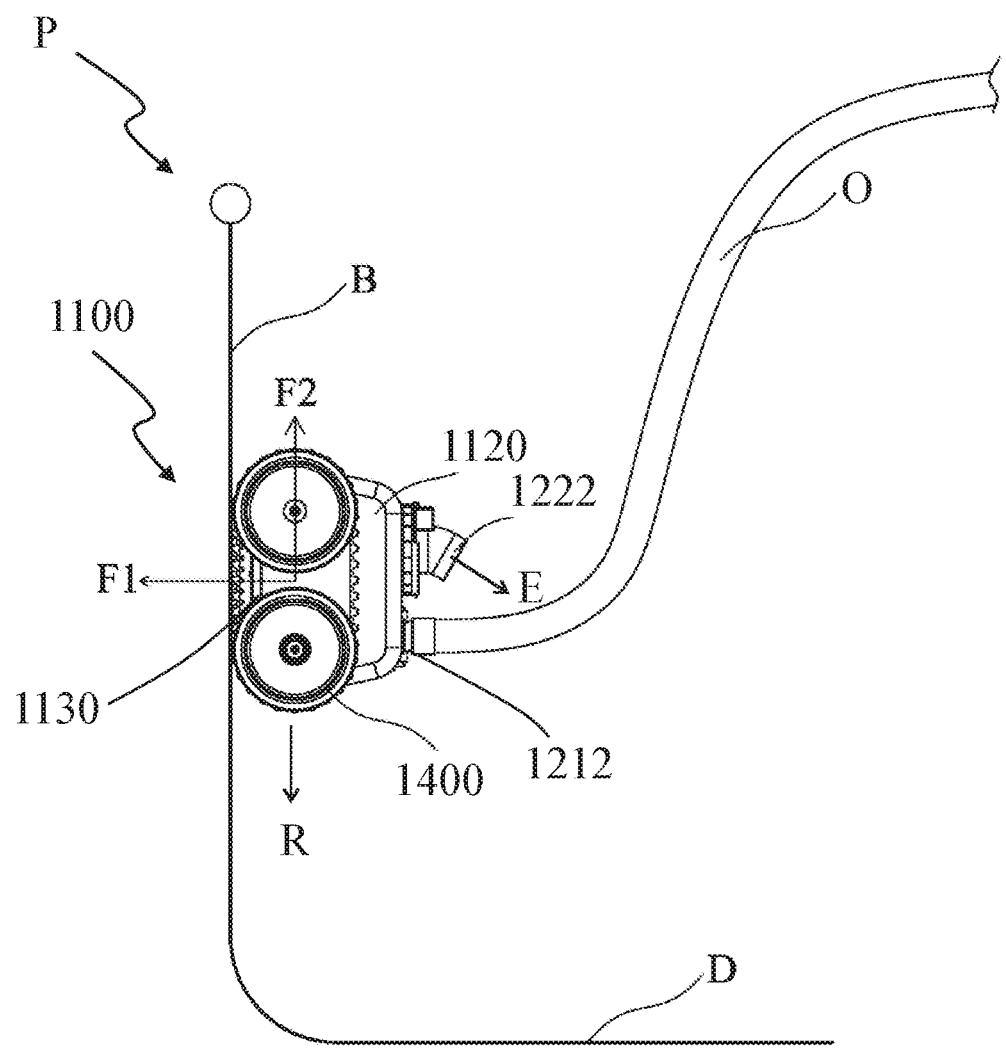
FIG. 13 is a side elevational view of the second pool cleaner traveling across the side wall of the pool.
Figure 15:
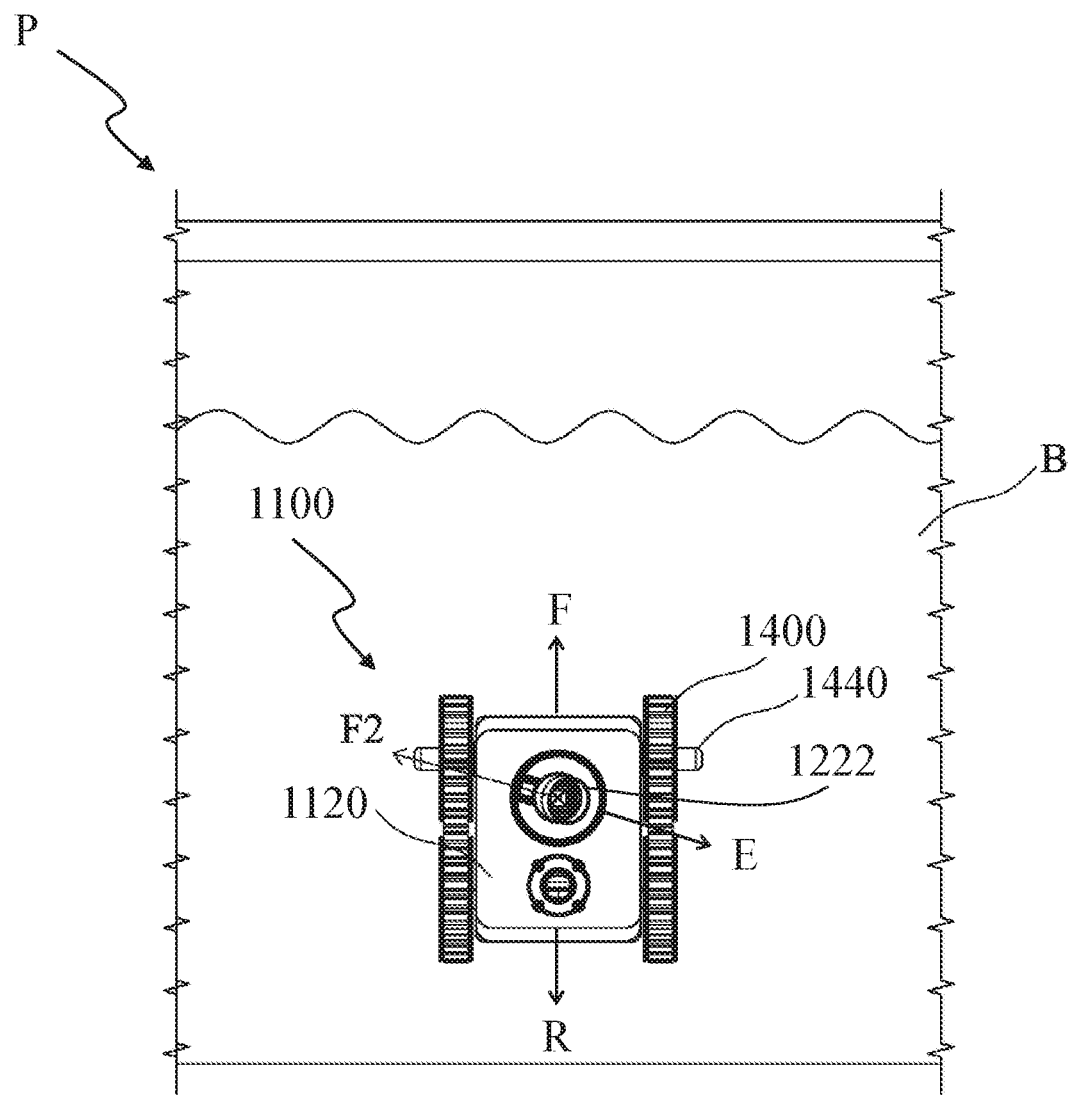
FIGS. 15 and 16 are top plan views of the second pool cleaner traveling in a left-forward direction across the side wall of the pool.
Figure 16:
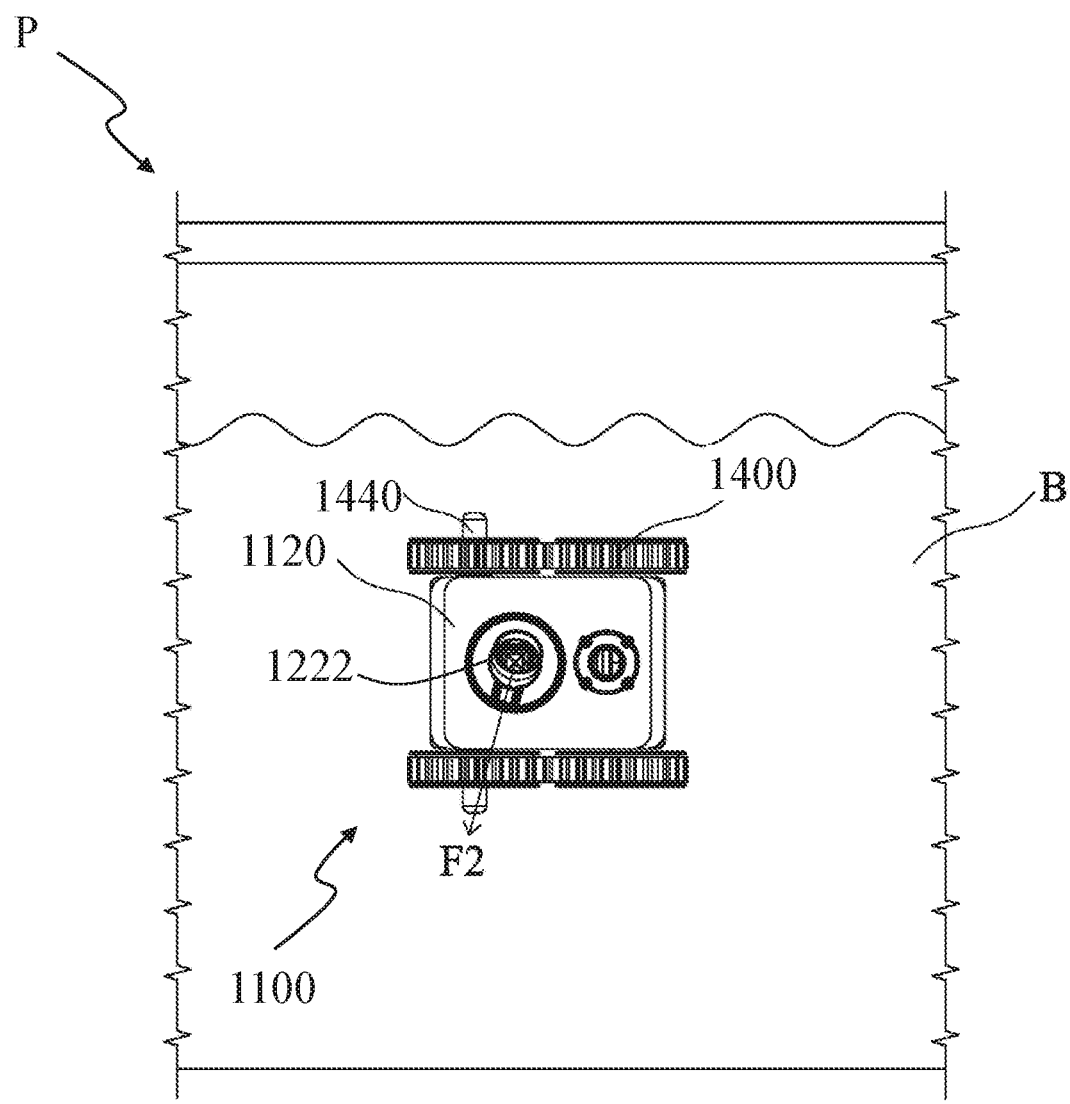

In FIG. 15, the outlet nozzle 1222 rotates counterclockwise such that the ejection direction E of the outlet nozzle 1222 extends toward a right-rear side of the pool cleaner 1100. The opposing propulsion force F2 extends toward a left-front side of the pool cleaner 1100. The left-front orientation of the propulsion force F2 causes the pool cleaner 1100 to turn left while traveling in the forward direction F, as shown in FIG. 16. Further counterclockwise rotation of the nozzle 1222 may be prevented due to contact between the limit arm 1252 of the outlet nozzle 1222 and the corresponding limit surface 1256 of the upper housing 1120, as shown in FIG. 10.

Figure 17:
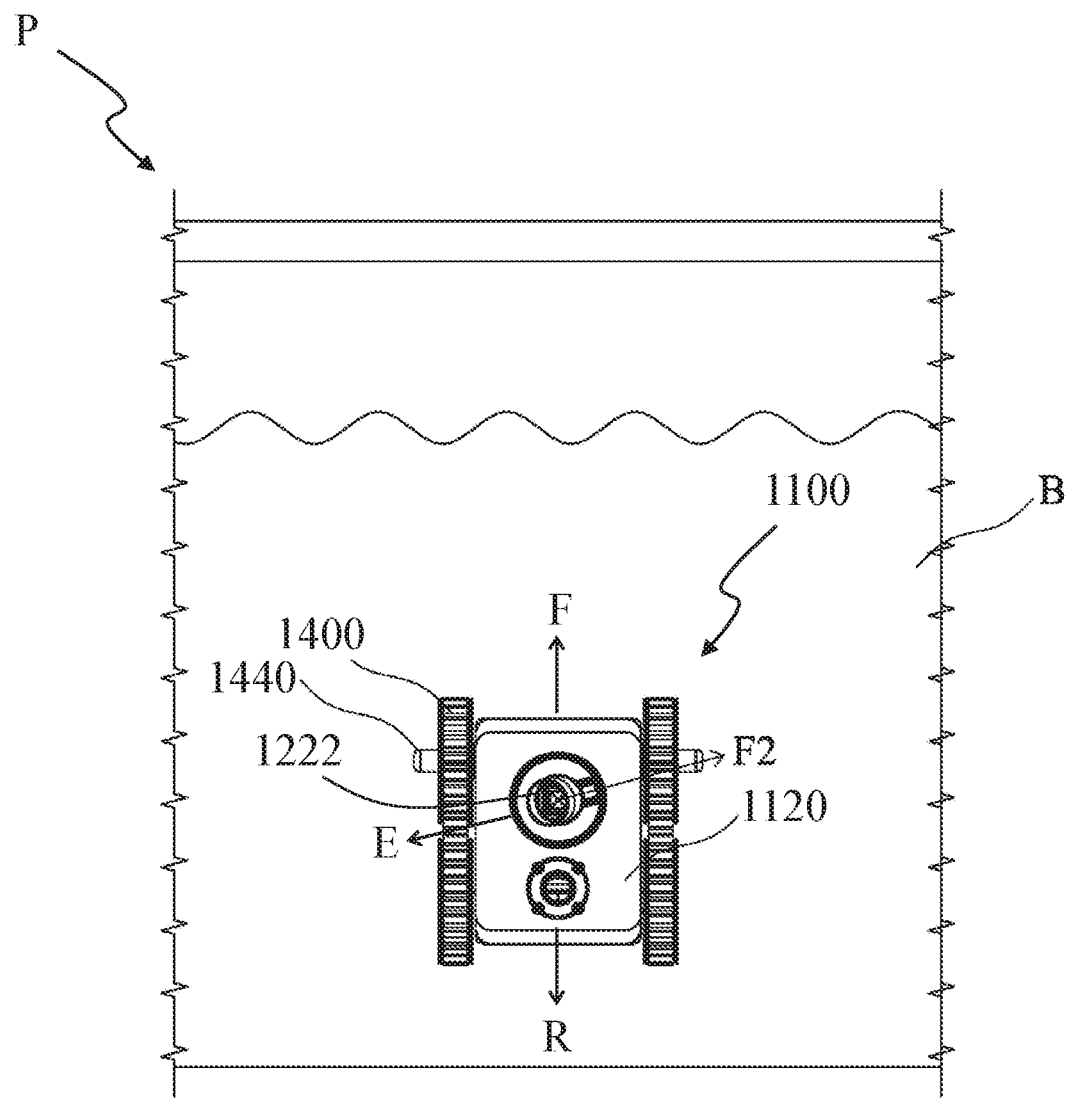
FIGS. 17 and 18 are top plan views of the second pool cleaner traveling in a right-forward direction across the side wall of the pool.
Figure 18:
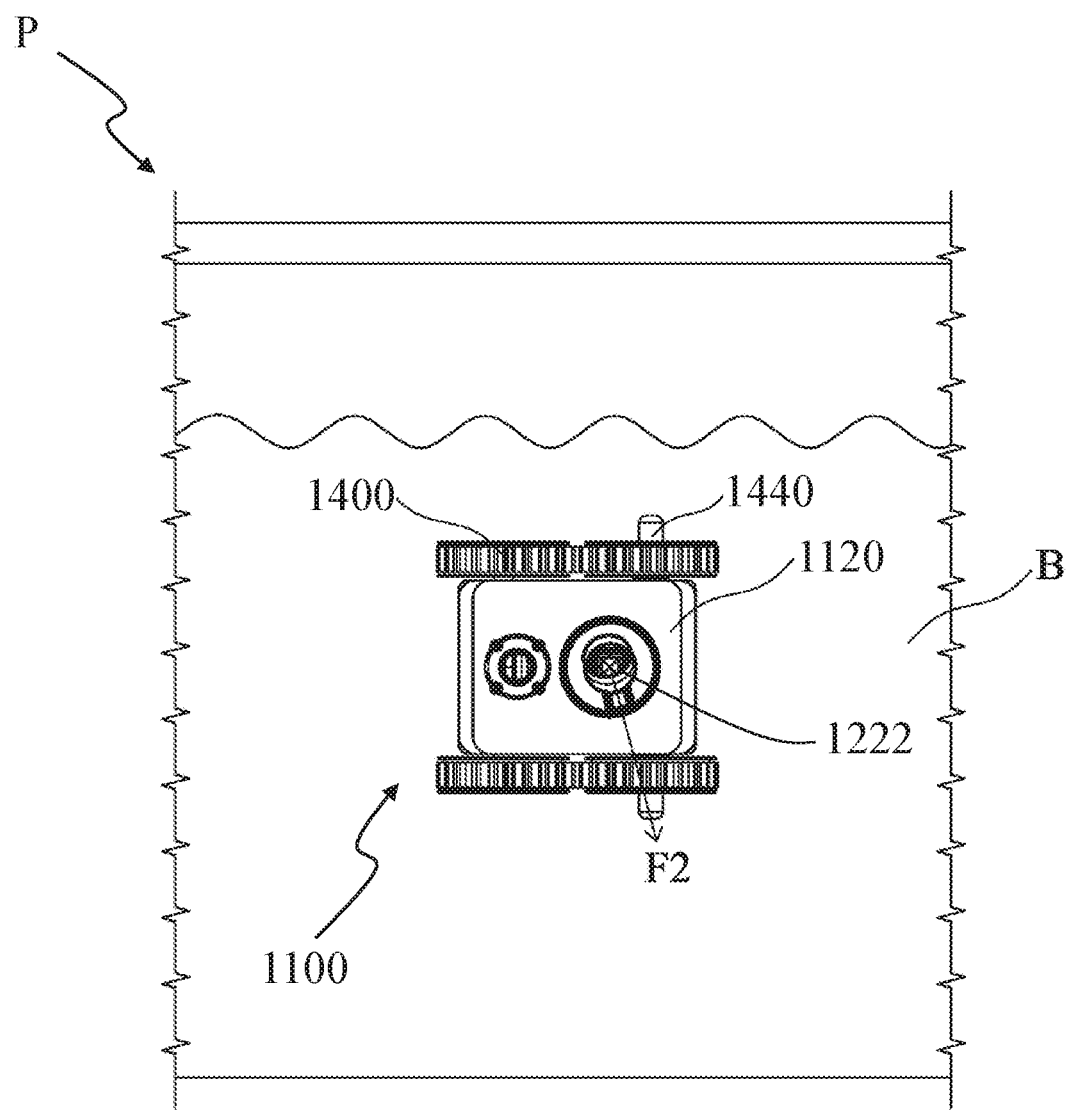

In FIG. 17, the outlet nozzle 1222 rotates clockwise such that the ejection direction E of the outlet nozzle 1222 extends toward a left-rear side of the pool cleaner 1100. The opposing propulsion force F2 extends toward a right-front side of the pool cleaner 1100. The right-front orientation of the propulsion force F2 causes the pool cleaner 1100 to turn right while traveling in the forward direction F, as shown in FIG. 18. Further clockwise rotation of the nozzle 1222 may be prevented due to contact between the limit arm 1252 of the outlet nozzle 1222 and the corresponding limit surface 1256 of the upper housing 1120, as shown in FIG. 10.

Referring next to FIGS. 19-25, a third pool cleaner 2100 is shown. The third pool cleaner 2100 is similar to the above-described pool cleaners 100, 1100, except as described below. Like elements of the third pool cleaner 2100 are identified by adding "2000" to corresponding reference numerals of the first pool cleaner 100.

Figure 20:
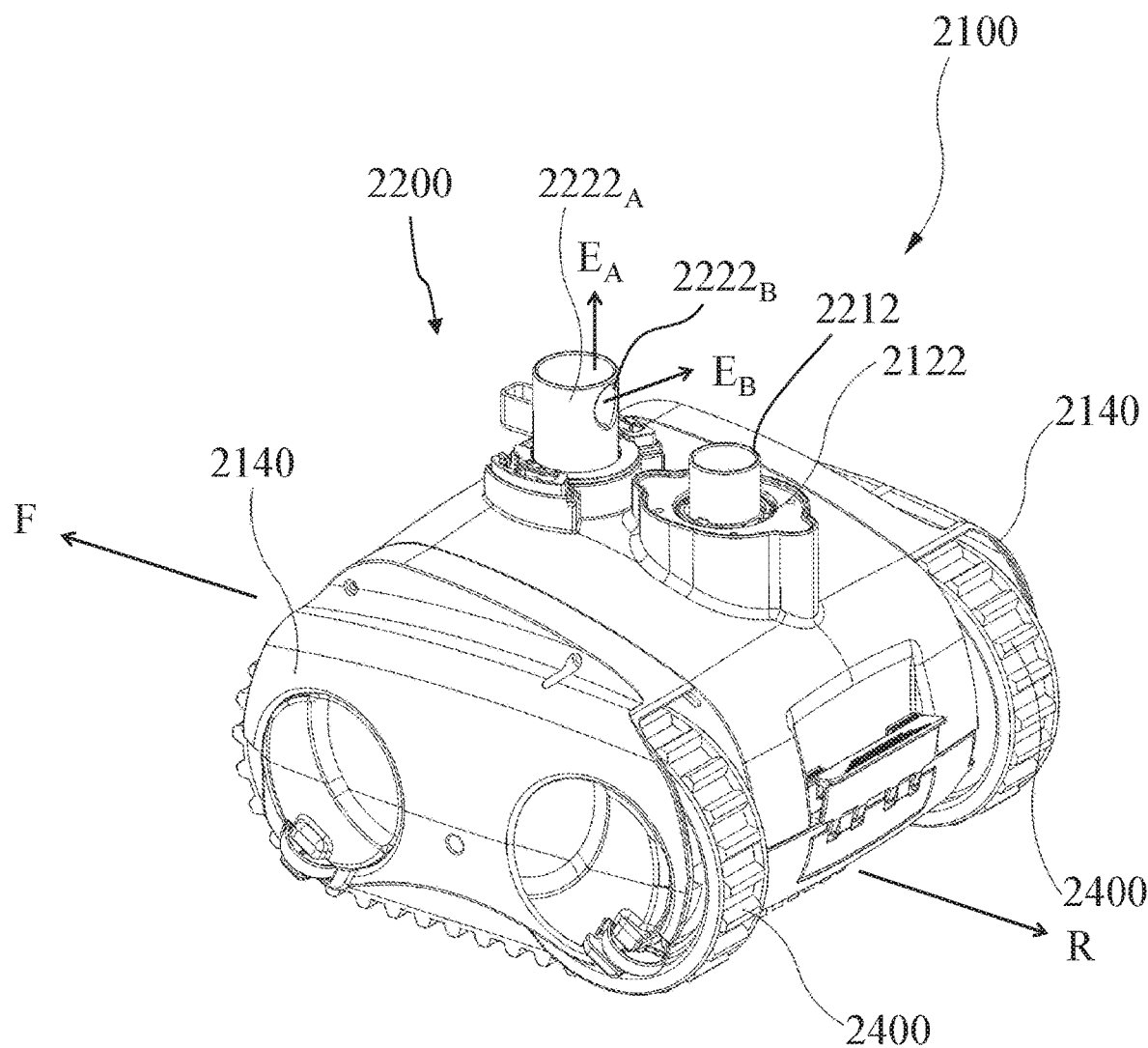
FIG. 20 is an assembled perspective view of the third pool cleaner.
Figure 21:
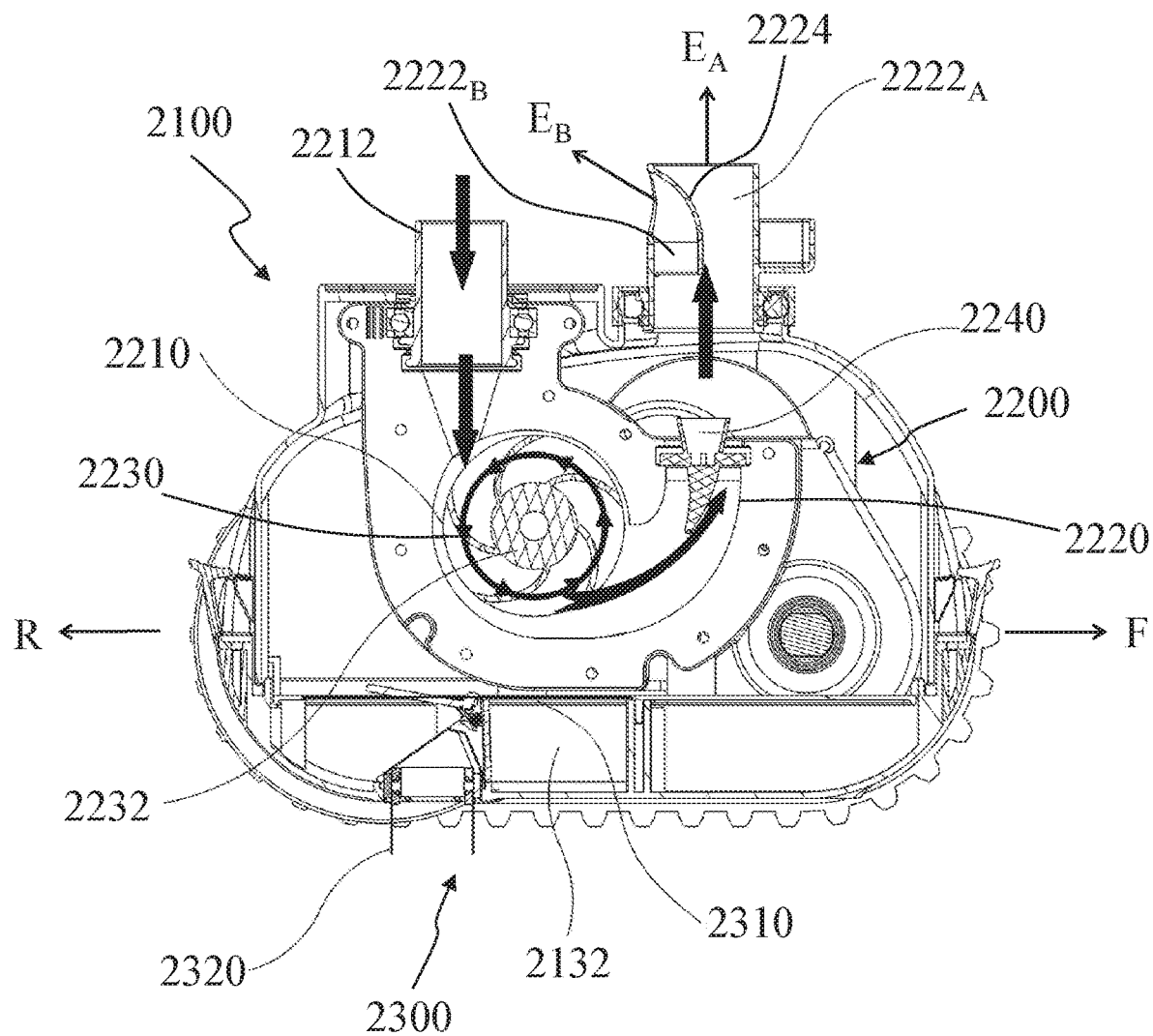
FIG. 21 is a cross-sectional view of the third pool cleaner.

As shown in FIGS. 20 and 21, the illustrative outlet nozzle 2222 of the third pool cleaner 2100 includes a first portion 2222$_A$ that extends substantially vertically upward and a second portion 2222$_B$ that extends substantially rearward to eject a first water stream in a vertically upward direction E$_A$ and a second water stream in a rearward direction E$_B$. An oblique internal wall 2224 separates the outlet nozzle portions 2222$_A$, 2222$_B$.

The outlet nozzle 2222 may have certain features in common with the above-described outlet nozzle 1222. For example, the vertically upward and rearward force components of the water being ejected in the ejection directions E$_A$, E$_B$ may generate a vertically downward adhesion force and a forward propulsion force, respectively. Also, the outlet nozzle 2222 may be configured to rotate relative to the upper housing 2120 to encourage turning.

Figure 19:
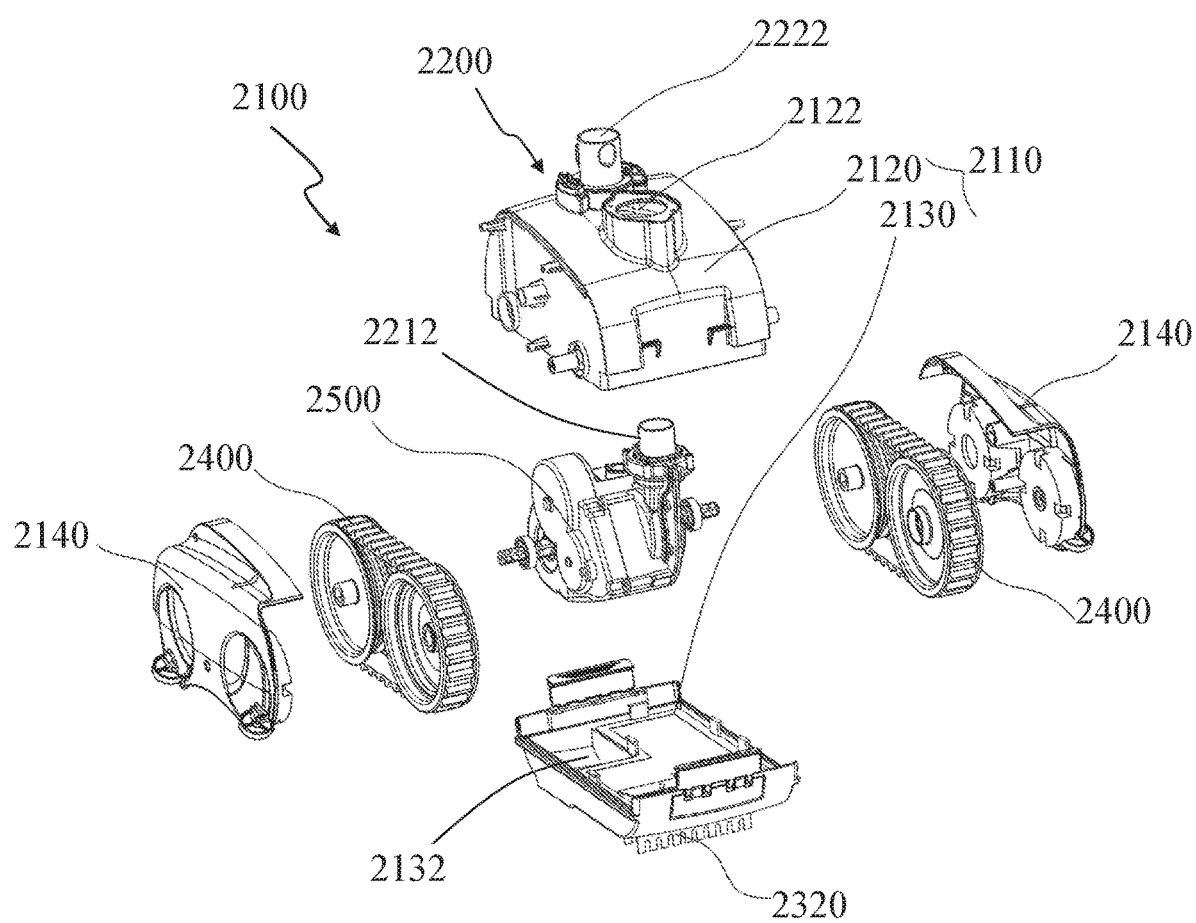
FIG. 19 is an exploded perspective view of a third automated pool cleaner of the present disclosure.

The housing 2110 may include shields 2140, as shown in FIGS. 19 and 20, that cover and protect the traction assemblies 2400 during use. The above-described first pool cleaner 100 and/or second pool cleaner 1100 may include similar shields.

3. Exemplary Transmission Assembly for Forward and Rearward Travel

Referring still to the pool cleaner 2100 of FIGS. 19-25, the transmission assembly 2500 may be configured to alternate rotation of the traction assemblies 2400 between the forward direction F and the rearward direction R. This forward and rearward travel may improve the coverage of the pool cleaner 2100 across the pool P.

Figure 22:
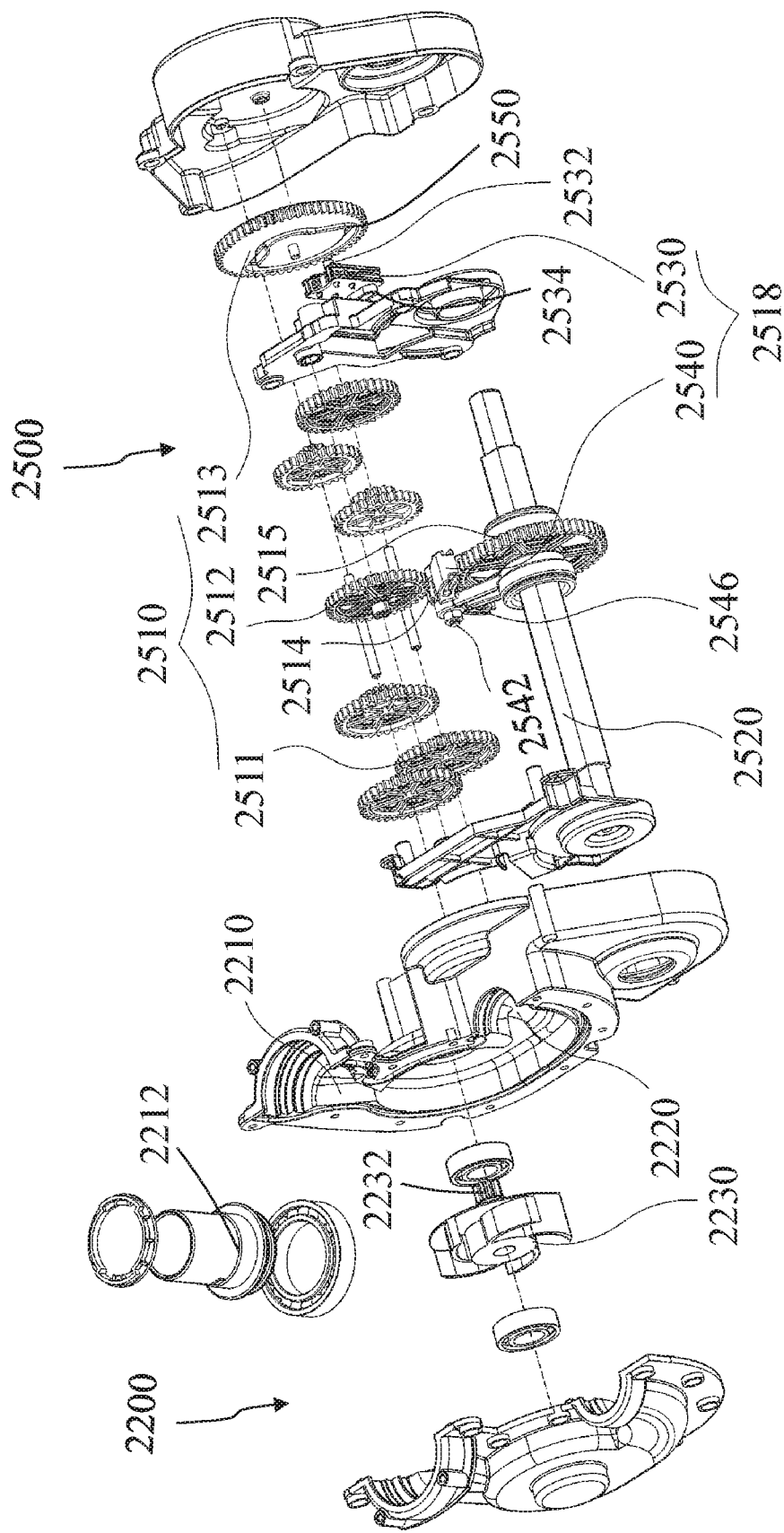
FIG. 22 is an exploded perspective view of a driving assembly and a transmission assembly of the third pool cleaner.

As shown in FIG. 22, the illustrative transmission assembly 2500 includes a gearset 2510 driven by the impeller 2230 and a shaft 2520 selectively driven by the gearset 2510. The shaft 2520 is operatively coupled to the left and right traction assemblies 2400 to propel the pool cleaner 2100. It is also within the scope of the present disclosure that the gearset 2510 may be driven by a motor on-board the pool cleaner 2100.

Figure 23:
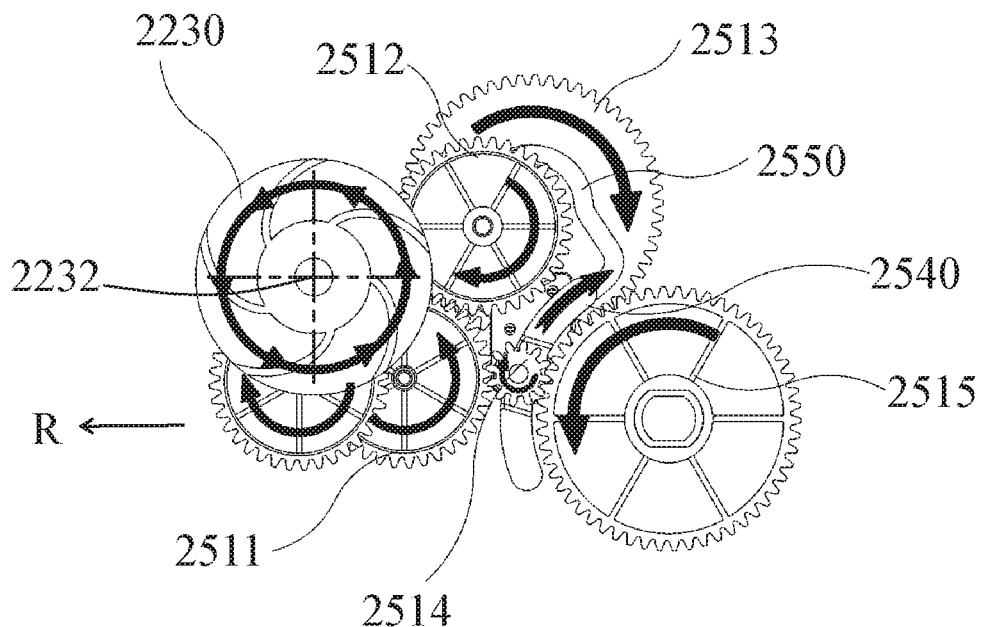
FIG. 23 is a schematic view of the transmission assembly in a first configuration for rearward travel.
Figure 24:
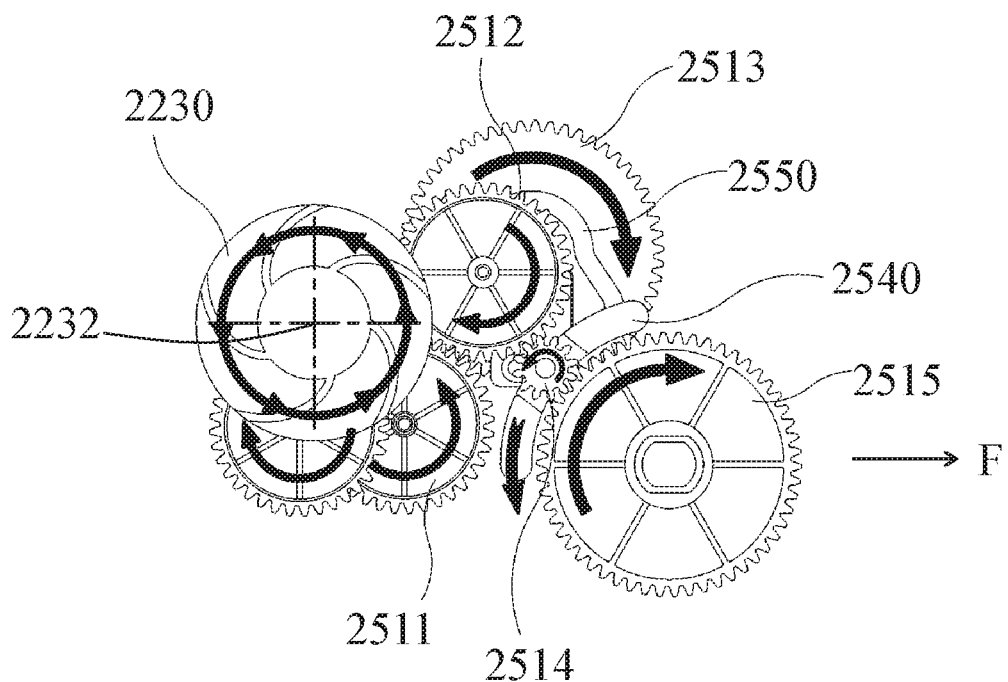
FIG. 24 is a schematic view of the transmission assembly in a second configuration for forward travel.

As shown in FIGS. 23 and 24, the gearset 2510 includes at least a first drive gear 2511, a second gear 2512, a third control gear 2513, a fourth idler gear 2514, and a fifth driven gear 2515. The operation of the gears 2511-2515 is described herein with reference to the counterclockwise rotation of the impeller 2230 in FIGS. 23 and 24, but it is understood that the directions may be reversed. The first drive gear 2511 is operatively coupled to the output shaft 2232 of the impeller 2230 for rotation in the same, counterclockwise direction. The second gear 2512 meshes with the first drive gear 2511 for rotation in the opposite, clockwise direction. The third control gear 2513 is operatively coupled to the output shaft 2232 of the impeller 2230 for rotation in the opposite, clockwise direction. The fourth idler gear 2514 is configured to move between a first configuration of FIG. 23 in which the fourth idler gear 2514 meshes with the first drive gear 2511 for rotation in the opposite direction and a second configuration of FIG. 24 in which the fourth idler gear 2514 meshes with the second gear 2512 for rotation in the opposite direction. The fifth driven gear 2515 meshes with the fourth idler gear 2514 for rotation in the opposite direction. The fifth driven gear 2515 is also coupled to the shaft 2520 (FIG. 22).

In the first configuration of FIG. 23, the fourth idler gear 2514 has a lower-left position relative to the other gears. The circumferential position of the fourth idler gear 2514 relative to the fifth driven gear 2515 is about 9 o'clock in FIG. 23. In this position, the fourth idler gear 2514 meshes with the first drive gear 2511 for rotation in the clockwise direction, and the fifth driven gear 2515 meshes with the fourth idler gear 2514 for rotation in the counterclockwise direction. The shaft 2520 rotates in the same counterclockwise direction as the fifth driven gear 2515, thereby propelling the pool cleaner 2100 in the rearward direction R.

In the second configuration of FIG. 24, the fourth idler gear 2514 has an upper-right position relative to the other gears. The circumferential position of the fourth idler gear 2514 relative to the fifth driven gear 2515 is about 10 o'clock in FIG. 24. In this position, the fourth idler gear 2514 meshes with the second gear 2512 for rotation in the counterclockwise direction, and the fifth driven gear 2515 meshes with the fourth idler gear 2514 for rotation in the clockwise direction. The shaft 2520 rotates in the same clockwise direction as the fifth driven gear 2515, thereby propelling the pool cleaner 2100 in the forward direction F.

As noted above, it is understood that the directions may be reversed. For example, it is understood that the counterclockwise rotation of the fifth driven gear 2515 in the first configuration of FIG. 23 could propel the pool cleaner 2100 forward, and the clockwise rotation of the fifth driven gear 2515 in the second configuration of FIG. 24 could propel the pool cleaner 2100 rearward.

As shown in FIGS. 22-25, the gearset 2510 includes a moveable support structure 2518 configured to move the fourth idler gear 2514 relative to the other gears. The illustrative support structure 2518 includes a first slider assembly 2530 that enables vertical movement of the fourth idler gear 2514 along a vertical arrow S1 and a second slider assembly 2540 that enables rotation of the fourth idler gear 2514 about the shaft 2520 and the fifth driven gear 2515 along a circumferential arrow C. The second slider assembly 2540 may also enable horizontal movement of the fourth idler gear 2514 relative to the first slider assembly 2530 along a horizontal arrow S2.

The illustrative first slider assembly 2530 includes a guide pin 2532 and a guide slot 2534 on opposing sides. On the side with the guide pin 2532, the first slider assembly 2530 interacts with the third control gear 2513. More specifically, the guide pin 2532 is received in a continuous guide track 2550 on the third control gear 2513, the guide track 2550 having a radially outward portion 2552 and a radially inward portion 2554.

Figure 25:
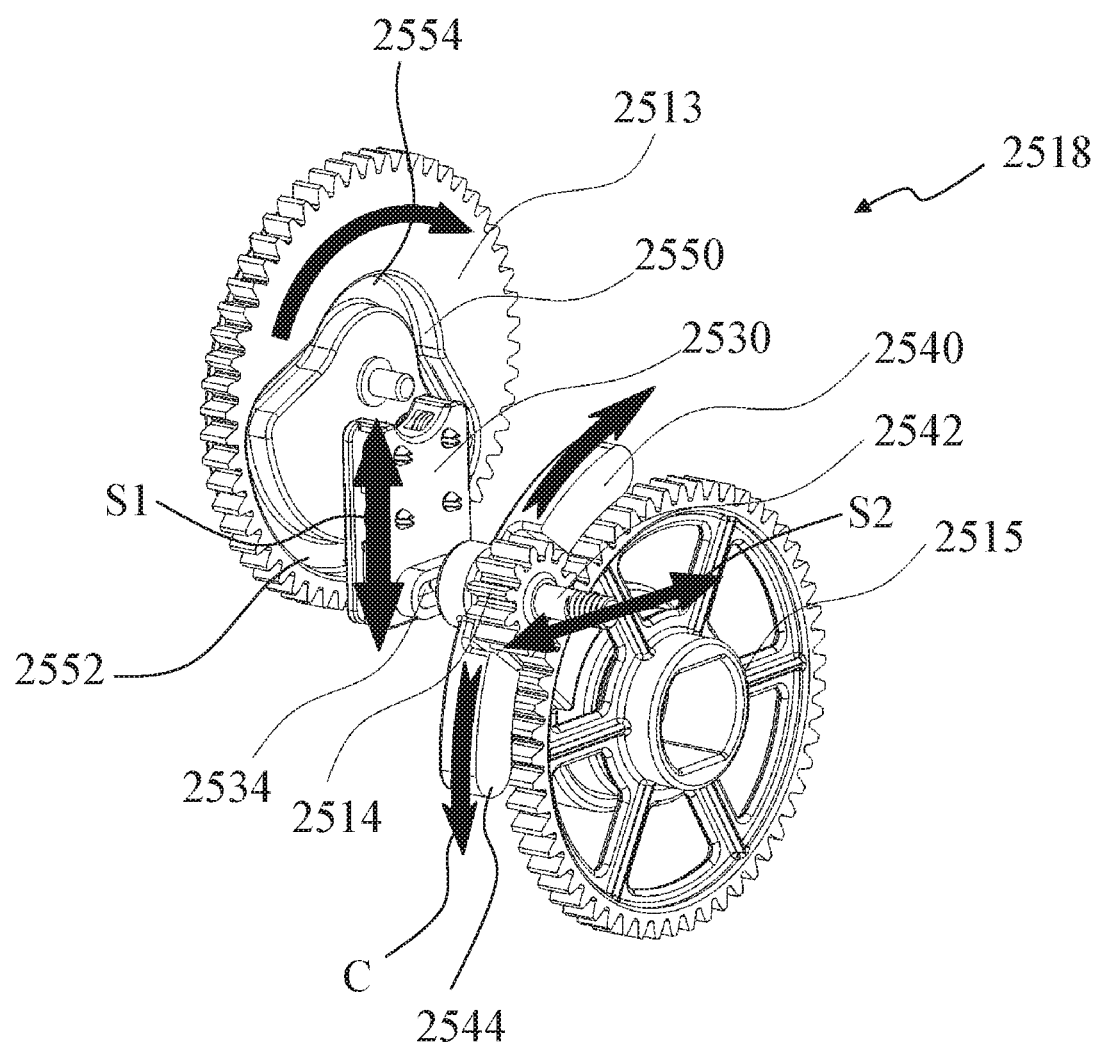
FIG. 25 is a schematic perspective view of the transmission assembly moving between the first and second configurations.
Figure 26:
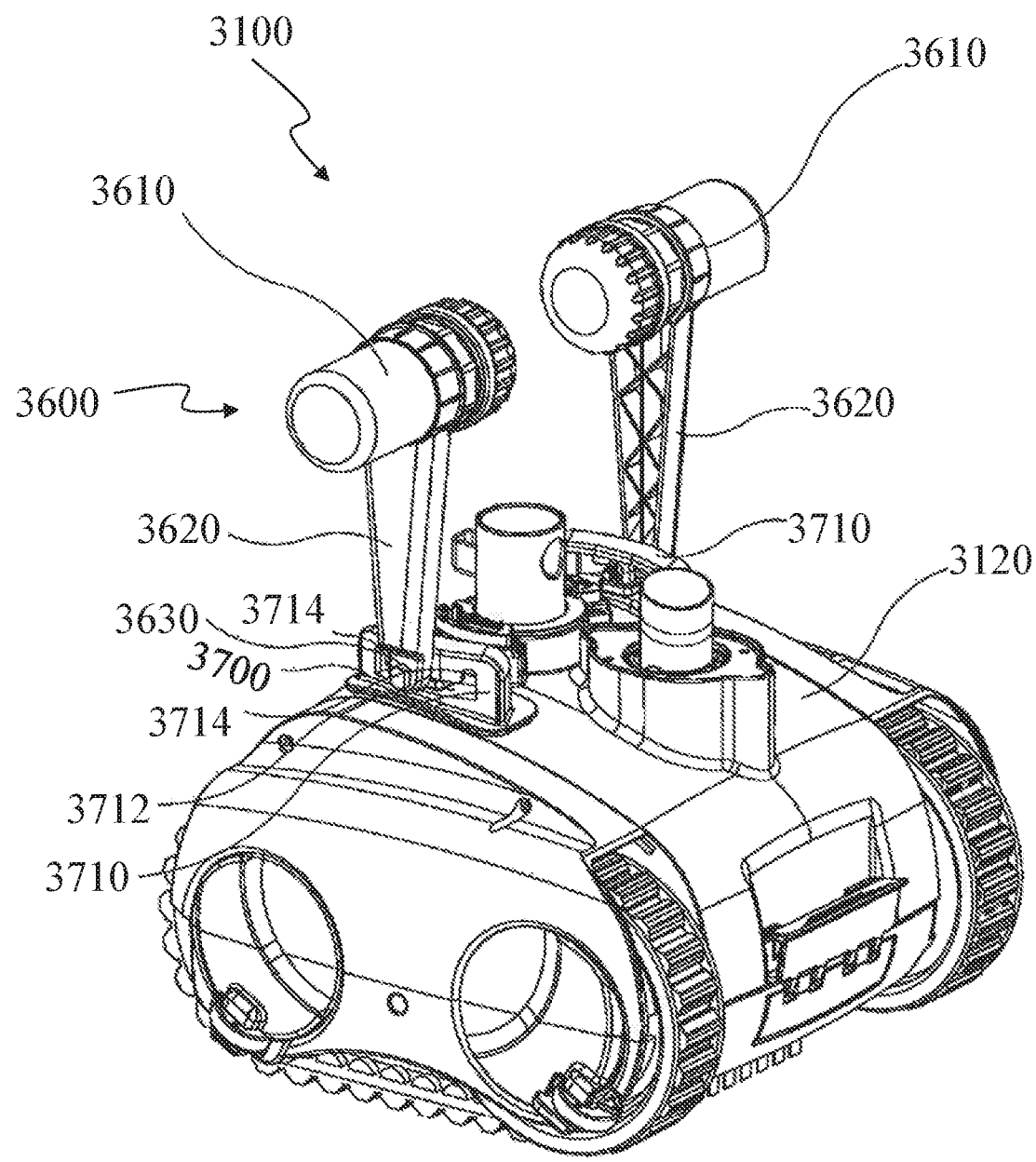
FIG. 26 is an assembled perspective view of a fourth automated pool cleaner of the present disclosure.
Figure 27:
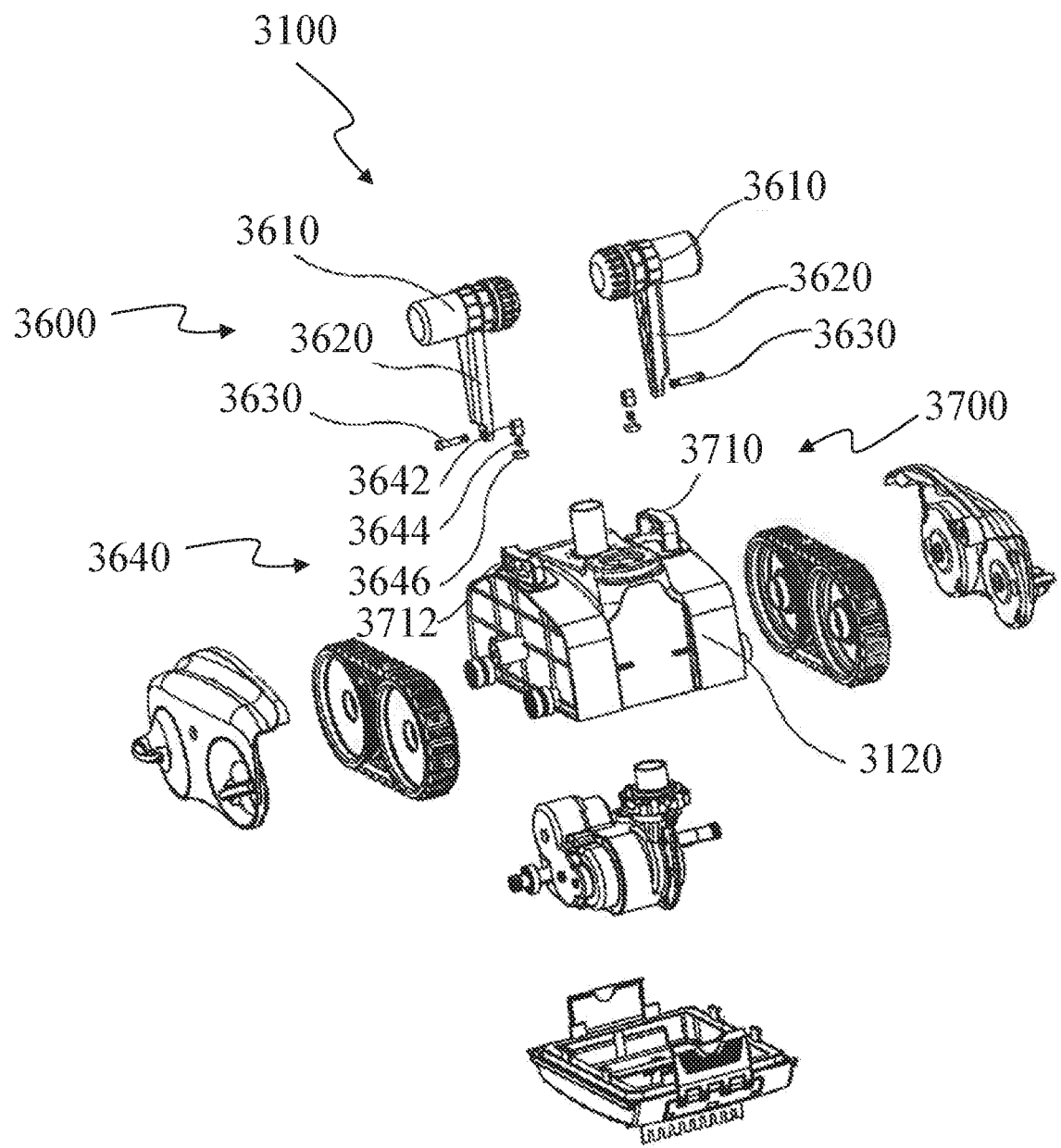
FIG. 27 is an exploded perspective view of the fourth pool cleaner.
Figure 28:
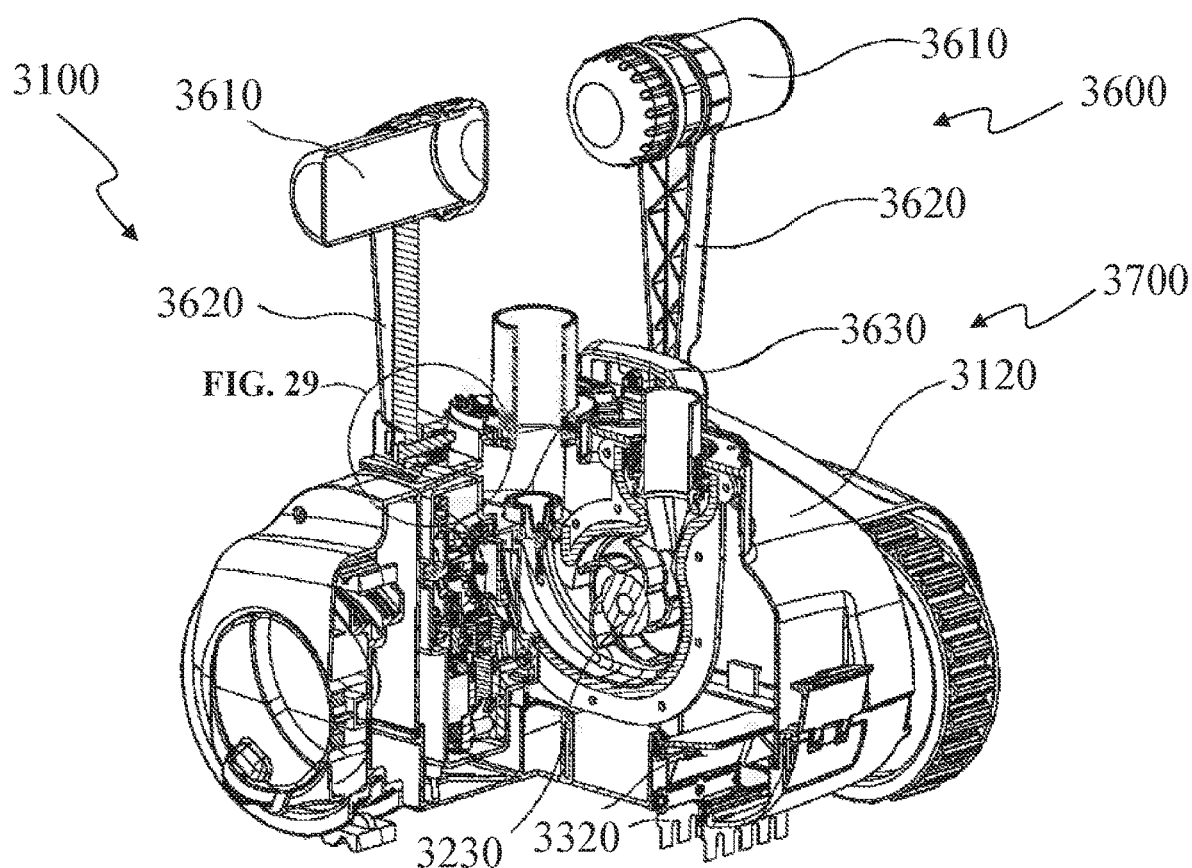
FIG. 28 is a partial cutaway view of the fourth pool cleaner.

When the third control gear 2513 rotates across the guide pin 2532, as shown in FIG. 25, the first slider assembly 2530 is pushed radially outward (i.e., downward) to follow the radially outward portion 2552 of the guide track 2550 and radially inward (i.e., upward) to follow the radially inward portion 2554 of the guide track 2550. The first slider assembly 2530 reciprocates along the vertical arrow S1 as the third control gear 2513 continues to rotate across the guide pin 2532. The circumferential extent of the radially outward portion 2552 and the radially inward portion 2554 of the guide track 2550 controls the proportion of time that the first slider assembly 2530 spends in the downward position and the upward position, respectively.

The illustrative second slider assembly 2540 includes a guide pin 2542, a C-shaped support block 2544, and a rotating support arm 2546 (FIG. 22). The guide pin 2542 interacts with the guide slot 2534 of the first slider assembly 2530 on one end, supports the fourth idler gear 2514 and the support block 2544 in the middle, and couples to the support arm 2546 (FIG. 22) on the other end. The support arm 2546 maintains a meshed engagement between the fourth idler gear 2514 and the fifth driven gear 2515 at all times, as shown in FIG. 25.

To achieve the first configuration of FIG. 23, in which the fourth idler gear 2514 meshes with the first drive gear 2511 and the fifth driven gear 2515, the first slider assembly 2530 is pushed downward along the vertical arrow S1 of FIG. 25. The guide pin 2542 of the second slider assembly 2540 also travels downward to remain in the guide slot 2534 of the first slider assembly 2530. The support arm 2546 (FIG. 22) converts the downward movement of the guide pin 2542 along the vertical arrow S1 to counterclockwise movement of the guide pin 2542 across the fifth driven gear 2515 along the circumferential arrow C until the fourth idler gear 2514 engages the first drive gear 2511 (FIG. 23). The guide pin 2542 of the second slider assembly 2540 is free to move leftward in the guide slot 2534 of the first slider assembly 2530 along the horizontal arrow S2 to accommodate this circumferential movement.

To achieve the second configuration of FIG. 24, in which the fourth idler gear 2514 meshes with the second gear 2512 and the fifth driven gear 2515, the first slider assembly 2530 is pulled upward along the vertical arrow S1 of FIG. 25. The guide pin 2542 of the second slider assembly 2540 also travels upward to remain in the guide slot 2534 of the first slider assembly 2530. The support arm 2546 (FIG. 22) converts the upward movement of the guide pin 2542 along the vertical arrow S1 to clockwise movement of the guide pin 2542 across the fifth driven gear 2515 along the circumferential arrow C until the fourth idler gear 2514 engages the second gear 2512 (FIG. 24). The guide pin 2542 of the second slider assembly 2540 is free to move rightward in the guide slot 2534 of the first slider assembly 2530 along the horizontal arrow S2 to accommodate this circumferential movement.

4. Exemplary Floating Assembly for Power Assistance

Referring next to FIGS. 26-32, a fourth pool cleaner 3100 is shown. The fourth pool cleaner 3100 is similar to the above-described pool cleaners 100, 1100, 2100, except as described below. Like elements of the fourth pool cleaner 3100 are identified by adding "3000" to corresponding reference numerals of the first pool cleaner 100.

The pool cleaner 3100 includes one or more floating assemblies 3600, illustratively two floating assemblies 3600 disposed on the right side and the left side of the pool cleaner 3100. Each floating assembly 3600 includes a floating body 3610, a support arm 3620, and a guide pin 3630, where the floating body 3610 and the guide pin 3630 are disposed at opposite ends of the support arm 3620.

Figure 32:
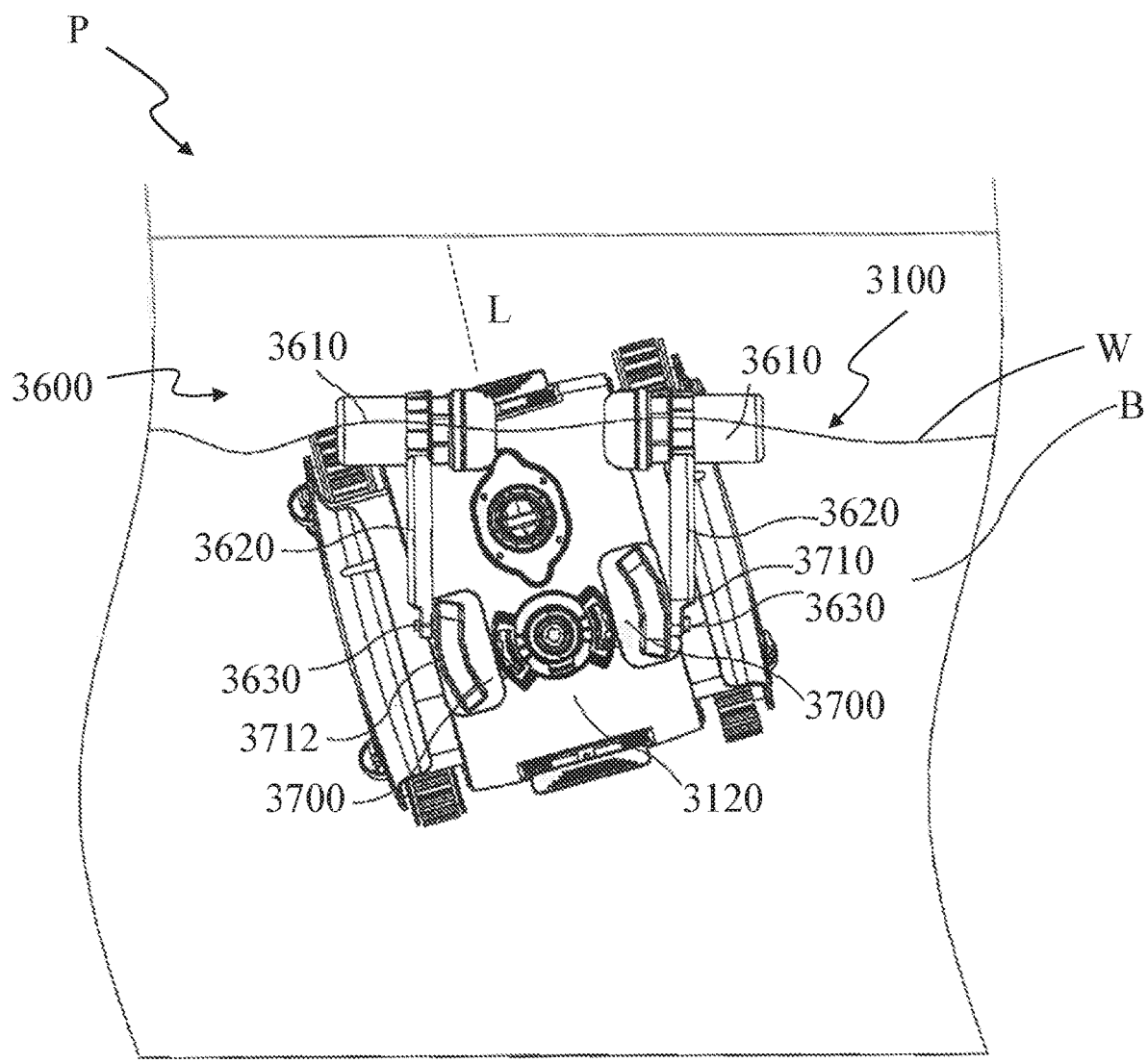
FIG. 32 is a top plan view of the fourth pool cleaner traveling in a left-forward direction across the side wall of the pool.
Figure 33:
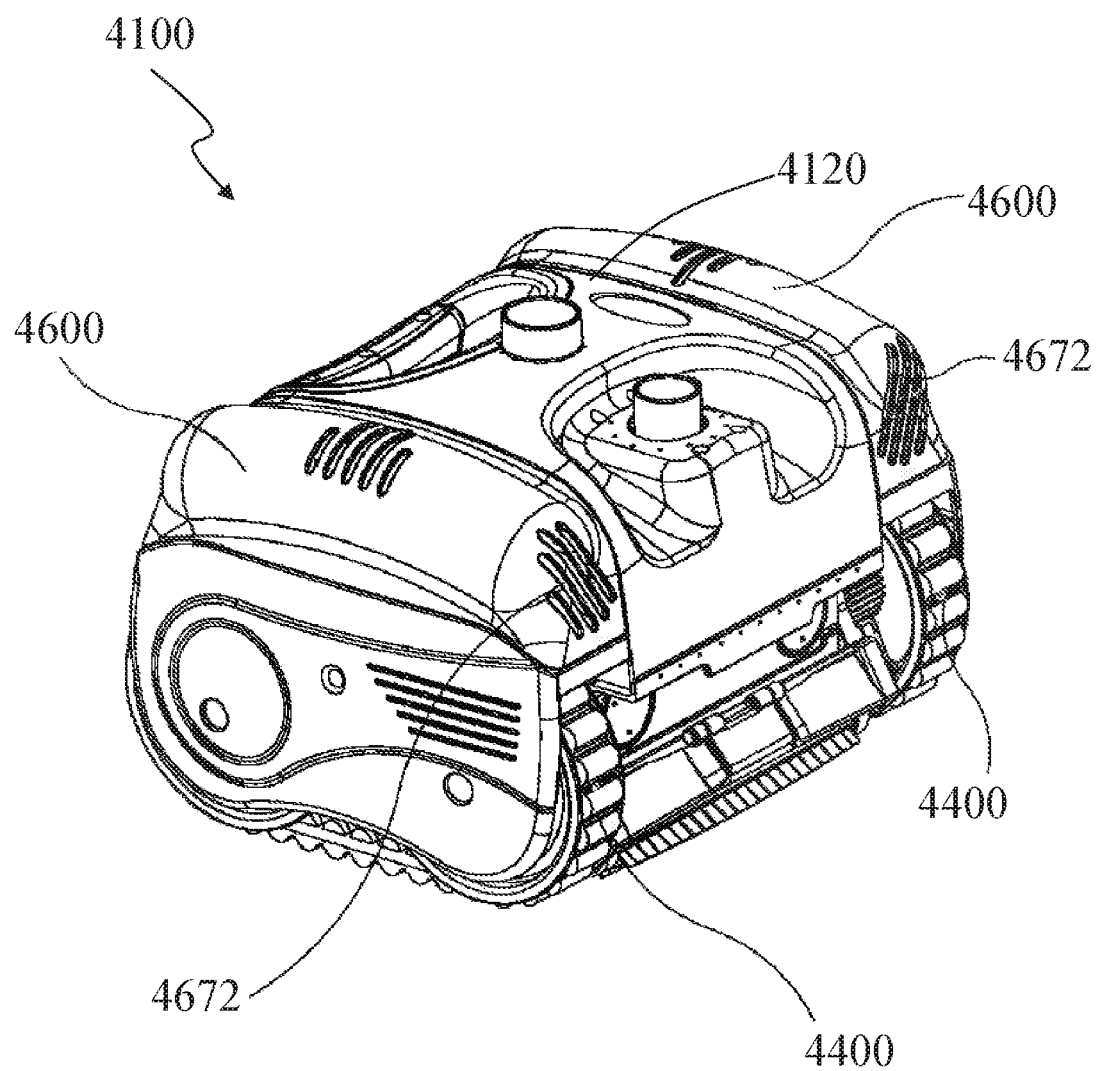
FIG. 33 is an assembled perspective view of a fifth automated pool cleaner of the present disclosure.
Figure 34:
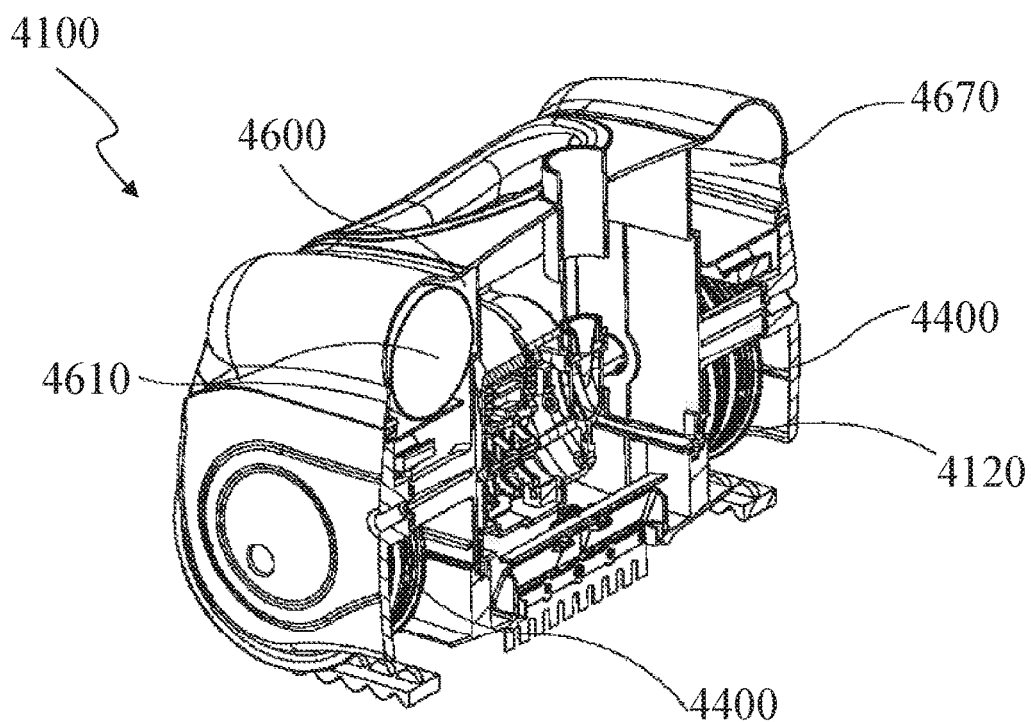
FIG. 34 is a cross-sectional view of the fifth pool cleaner taken transversely across the pool cleaner.
Figure 35:
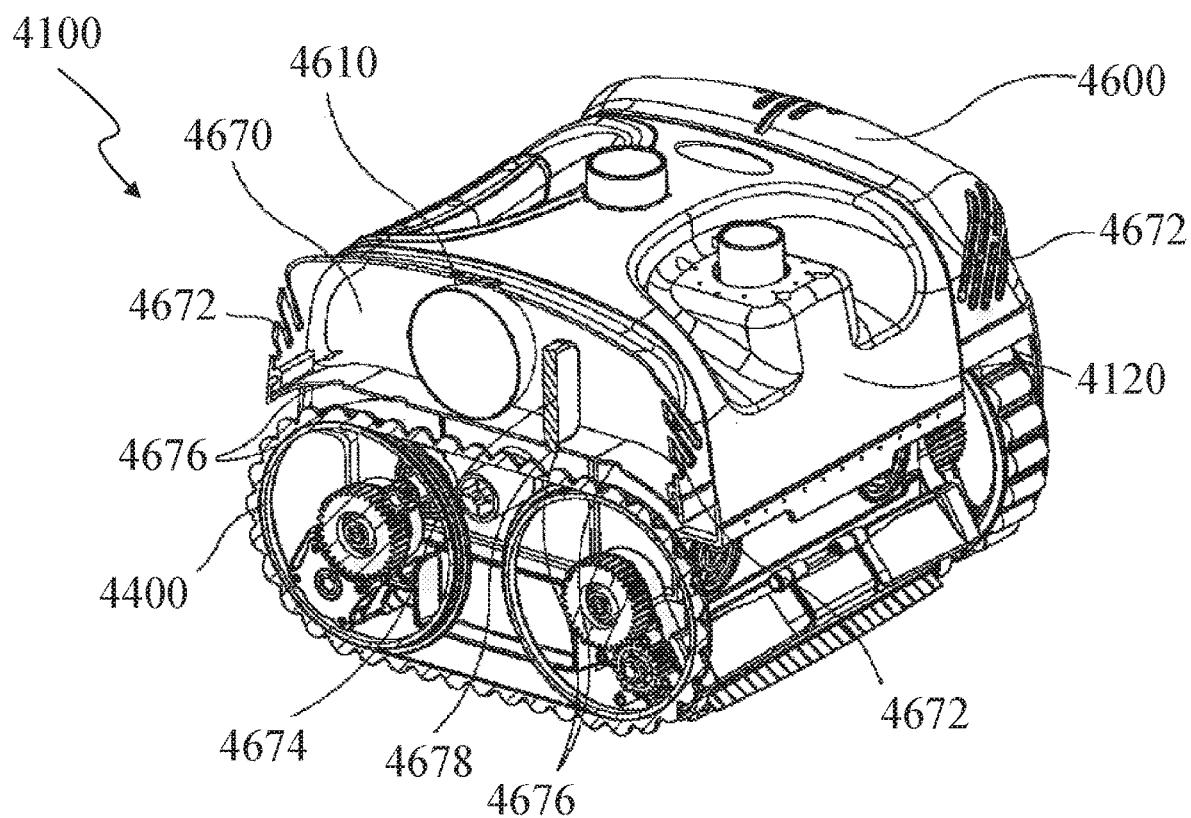
FIG. 35 is a cross-sectional view of the fifth pool cleaner taken longitudinally along a side of the pool cleaner.

The floating body 3610 is configured to float in the water W of the pool P (FIG. 32). Each floating body 3610 may have a cylindrical shape or another suitable shape. In one embodiment, each floating body 3610 is a hollow structure configured to float in the water W. In another embodiment, each floating body 3610 is a solid structure made of a low-density material (e.g., foam) that is configured to float in the water W.

The support arm 3620 is fixedly coupled to the floating body 3610 at its upper end and rotatably coupled to the guide pin 3630 at its lower end. The lower end of the support arm 3620 defines a hole 3622 that receives the guide pin 3630, and the support arm 3620 is configured to rotate about the guide pin 3630.

The guide pin 3630 is illustratively a bolt having a head 3632 at one end and a removable nut 3634 at the other end.

Figure 29:
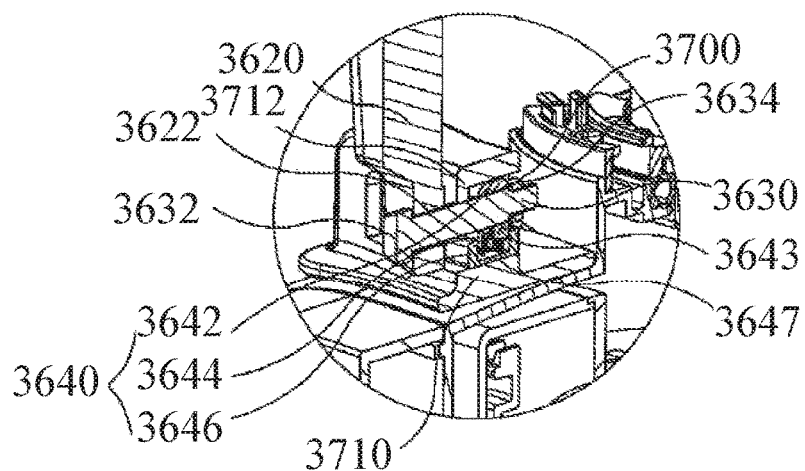
FIG. 29 is a detailed view of the area circled in FIG. 28.

The pool cleaner 3100 also includes a seat 3700 for moveably and independently coupling each floating assembly 3600 to the pool cleaner 3100, illustratively two seats 3700 symmetrically disposed on the right side and the left side of the upper housing 3120 of the pool cleaner 3100. Each seat 3700 includes an arc-shaped vertical wall 3710 that defines a horizontal track 3712 sized to receive the guide pin 3630 with the head 3632 and the nut 3634 disposed opposing sides of the vertical wall 3710, as shown in FIG. 29.

At opposing ends of the track 3712, raised notches 3714 are provided for catching the guide pin 3630. A return device 3640 may be provided on the guide pin 3630 to force the guide pin 3630 upward and into the raised notches 3714. The illustrative return device 3640 includes an upper block 3642 coupled to the guide pin 3630 and abutting the upper side of the track 3712, an intermediate elastic member such as a spring 3644, and a lower base 3646 abutting the lower side of the track 3712. The upper block 3642 has a downward-extending sleeve 3643, and the lower base 3646 has an upward-extending groove 3647 covering the sleeve 3643. The spring 3644 is located in the sleeve 3643 and forces the upper block 3642 apart from the lower base 3646 and into engagement with the raised notch 3712.

Figure 30:
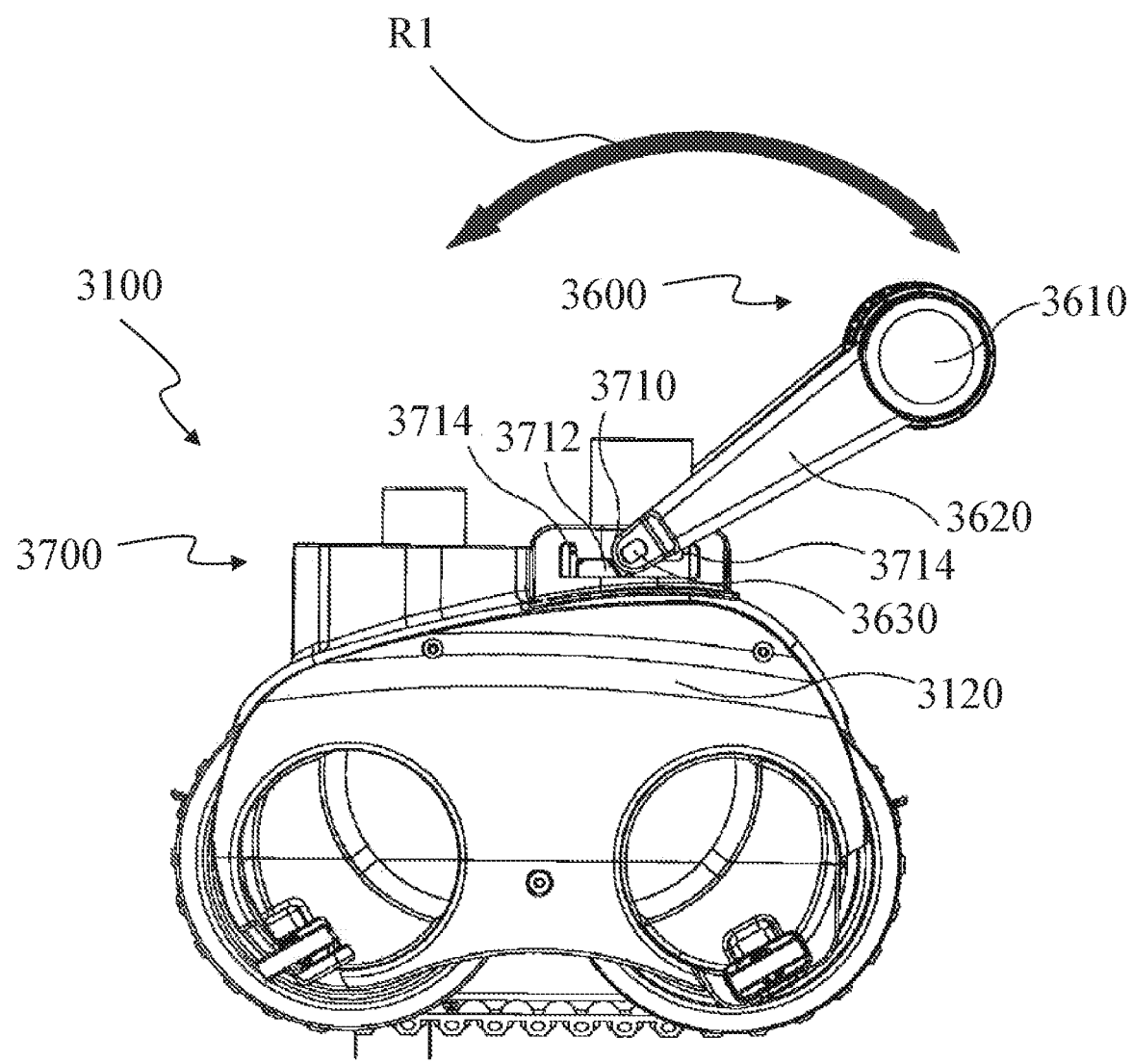
FIG. 30 is a side elevational view of the fourth pool cleaner.
Figure 31:
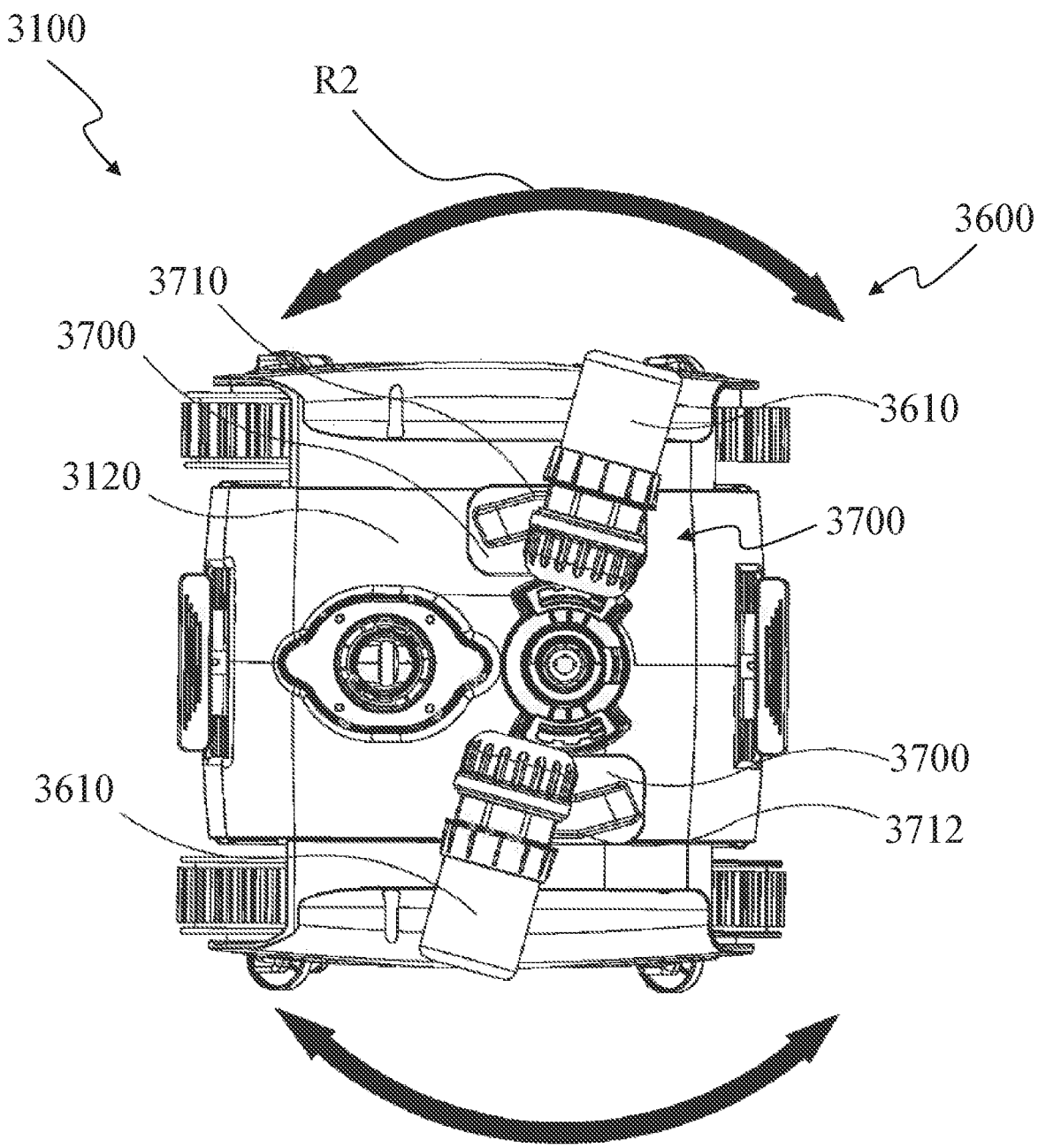
FIG. 31 is a top plan view of the fourth pool cleaner.

The floating assembly 3600 is configured to move relative to the pool cleaner 3100 to float upward in the water W. As shown in FIG. 30, the floating body 3610 is configured to move relative to the guide pin 3630 in forward and rearward directions R1. Additionally, and as shown in FIG. 31, the floating body 3610 is configured to move through the arc-shaped track 3712 in the wall 3710 in forward and rearward arc-shaped directions R2.

In operation, each floating assembly 3600 may provide power assistance to the pool cleaner 3100, especially when climbing the wall B of the pool P as shown in FIG. 32. During the initial climb, each floating assembly 3600 may float upward in the water W, thereby counteracting the gravitational force on the pool cleaner 3100. As the pool cleaner 3100 continues to climb and approach the surface of the water W, the buoyant effect of the floating assemblies 3600 is reduced. The continued driving force in the forward direction F causes the pool cleaner 3100 to turn. In FIG. 32, for example, the pool cleaner 3100 has turned left of vertical with the left-side floating assembly 3600 positioned forward in the track 3712 to face the front-ride side of the pool cleaner 3100 and the right-side floating assembly 3600 positioned rearward in the track 3712 to face the front-ride side of the pool cleaner 3100. In this position, the left-side and right-side floating assemblies 3600 are asymmetrically disposed relative to the longitudinal axis L of the pool cleaner 3100. Eventually, the gravitational force on the pool cleaner 3100 overcomes the reduced buoyancy of the floating assembly 3600 and the driving force on the pool cleaner 3100 and pulls the pool cleaner 3100 back into the water W.

Referring next to FIGS. 33-36, a fifth pool cleaner 4100 is shown. The fifth pool cleaner 4100 is similar to the above-described pool cleaners 100, 1100, 2100, 3100, except as described below. Like elements of the fifth pool cleaner 4100 are identified by adding "4000" to corresponding reference numerals of the first pool cleaner 100.

The pool cleaner 4100 includes one or more floating assemblies 4600, illustratively two floating assemblies 4600 disposed on the right side and the left side of the pool cleaner 4100. Each floating assembly 4600 includes a floating body 4610 disposed within a water-filled guide cavity 4670.

The floating body 4610 is configured to float in the water W of the pool P (FIG. 36), which is also allowed to enter the guide cavity 4670. Each floating body 4610 may have a spherical shape or another suitable shape.

Figure 36:
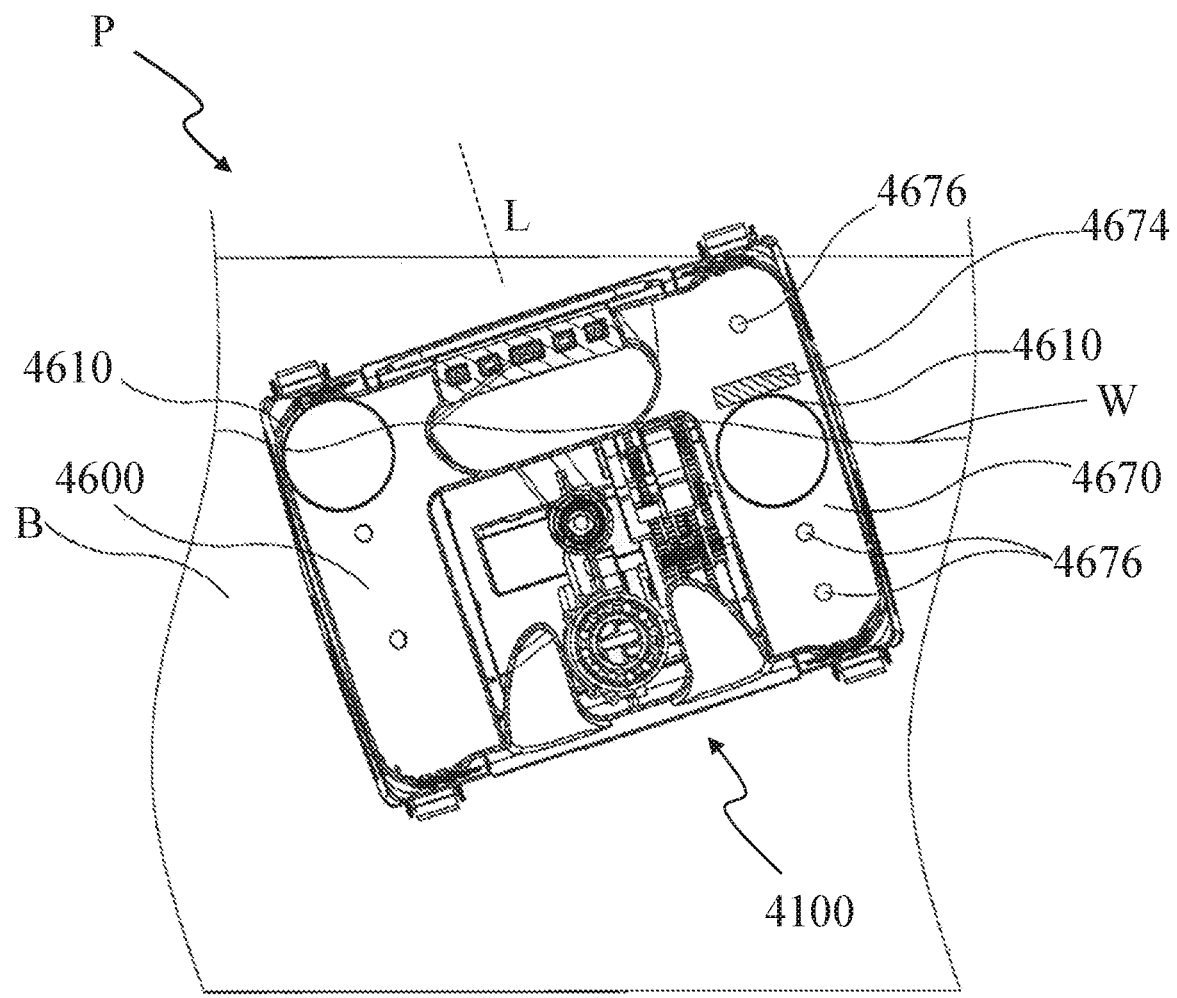
FIG. 36 is a top plan view of the fifth pool cleaner traveling in a left-forward direction across the side wall of the pool.

The guide cavity 4670 extends forward and rearward across the upper housing 4120 with openings 4672 disposed at the front and rear ends, which allow the water W to enter the guide cavity 4670. The opposing guide cavities 4670 may have different internal lengths to cause an imbalance or offset between the opposing floating bodies 4610. As shown in FIG. 36, for example, the left-side guide cavity 4670 has a relatively long internal length that spans substantially the entire length of the pool cleaner 4100. By contrast, the right-side guide cavity 4670 has a relatively short internal length that is limited by an internal wall 4674, which extends into the guide cavity 4670 to block further travel of the floating body 4610. The guide cavity 4670 may include a plurality of spaced-apart holes 4676 designed to receive a peg 4678 of the wall 4674 in a variety of different positions. By moving the wall 4674 to a desired hole 4676, a user may adjust the internal length of the guide cavity 4670 and the corresponding offset between the floating bodies 4610.

In operation, each floating assembly 4600 may provide power assistance to the pool cleaner 4100, especially when climbing the wall B of the pool P as shown in FIG. 36. During the initial climb, each floating body 4610 may float upward in the water W, thereby counteracting the gravitational force on the pool cleaner 4100. As the pool cleaner 4100 continues to climb and approach the surface of the water W, the buoyant effect of the floating bodies 4610 is reduced. The continued driving force in the forward direction F causes the pool cleaner 4100 to turn. In FIG. 36, for example, the pool cleaner 4100 has turned left of vertical with the left-side floating body 4610 positioned entirely forward in its guide cavity 4670 and the right-side floating body 4610 positioned more rearward in its guide cavity 4670 due to the limiting nature of the internal wall 4674. In this position, the left-side and right-side floating bodies 4610 are asymmetrically disposed relative to the longitudinal axis L of the pool cleaner 4100. Eventually, the gravitational force on the pool cleaner 4100 overcomes the reduced buoyancy of the floating assemblies 4600 and the driving force on the pool cleaner 4100 and pulls the pool cleaner 4100 back into the water W.

One or more of the features described in Sections 1-4 above may be combined. For example, a pool cleaner may have steering projections as described in Section 1, controlled water ejection as described in Section 2, a forward and rearward transmission assembly as described in Section 3, and/or an asymmetrical floating assembly as described in Section 4.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A pool cleaner for use in a pool containing water and having a pump, the pool cleaner having a longitudinal axis, a transverse axis, and a vertical axis, the pool cleaner comprising:
 a housing;
 a driving assembly comprising:
  an inlet conduit configured to receive pressurized water from the pump;
  an impeller in fluid communication with the inlet conduit;
  an outlet conduit in fluid communication with the impeller; and
  an outlet nozzle coupled to the outlet conduit and configured to eject pressurized water upward from the housing and into the pool in a parallel or oblique ejection direction relative to the vertical axis;
 at least one traction assembly coupled to the impeller to drive the housing across the pool; and
 a filtration assembly disposed in the housing and configured to filter water from the pool.

2. The pool cleaner of claim 1, further comprising an inlet connector coupled to the inlet conduit, the inlet connector configured to connect to a flexible hose that extends from the pump and into the pool.

3. The pool cleaner of claim 1, wherein the ejection direction includes an upward component that extends upward from the housing and a rearward component that extends rearward from the housing, the upward component generating a downward adhesion force and the rearward component generating a forward propulsion force.

4. The pool cleaner of claim 1, wherein the outlet nozzle is rotatable relative to the housing between:
 a first position in which the ejection direction extends toward a rear side of the housing;

a second position in which the ejection direction extends toward a right side of the housing to steer the housing left; and
a third position in which the ejection direction extends toward a left side of the housing to steer the housing right.

5. The pool cleaner of claim 1, wherein the outlet nozzle has a bent shape.

6. The pool cleaner of claim 1, wherein the outlet nozzle includes:
a first portion that ejects pressurized water in a parallel ejection direction relative to the vertical axis;
a second portion that ejects pressurized water in an oblique ejection direction relative to the vertical axis; and
an internal wall separating the first and second portions.

7. The pool cleaner of claim 1, wherein the oblique ejection direction forms an oblique angle relative to the vertical axis, the oblique angle being greater than 0 degrees and less than or equal to about 45 degrees.

8. The pool cleaner of claim 1, further comprising a weight coupled to the outlet nozzle opposite the ejection direction.

9. The pool cleaner of claim 1, wherein the housing includes an upper housing and a lower housing, the upper housing defining an inlet opening that accommodates an inlet connector to the inlet conduit and an outlet opening that accommodates the outlet nozzle from the outlet conduit.

10. The pool cleaner of claim 9, wherein the lower housing defines a suction inlet in fluid communication with the filtration assembly.

11. The pool cleaner of claim 1, further comprising a transmission assembly operatively coupled to the impeller and the at least one traction assembly, the transmission assembly having:
a first configuration that drives the at least one traction assembly rearward; and
a second configuration that drives the at least one traction assembly forward.

12. The pool cleaner of claim 1, wherein the at least one traction assembly comprises:
a right traction assembly having a right steering projection that projects from a right side of the pool cleaner; and
a left traction assembly having a left steering projection that projects from a left side of the pool cleaner.

13. A pool cleaner for use in a pool containing water, the pool cleaner comprising:
a housing;
a driving assembly;
a transmission assembly comprising:
a first gear coupled to the driving assembly;
a second gear rotatable in an opposite direction than the first gear;
an idler gear moveable between a first configuration in which the idler gear meshes with the first gear and a second configuration in which the idler gear meshes with the second gear; and
a driven gear that meshes with the idler gear in the first and second configurations;
at least one traction assembly coupled to the driven gear of the transmission assembly to drive the housing in a first direction in the first configuration and a second direction in the second configuration; and
a filtration assembly disposed in the housing and configured to filter water from the pool.

14. The pool cleaner of claim 13, wherein the transmission assembly further comprises:

a control gear with a guide track; and
a support structure coupled to the idler gear, the support structure including a guide pin that travels repeatedly through the guide track to reciprocate the idler gear between the first and second configurations.

15. The pool cleaner of claim 13, wherein the transmission assembly further comprises:
a shaft coupled between the driven gear and the at least one traction assembly; and
a support structure coupled to the idler gear, the support structure rotating about the shaft to move the idler gear between the first and second configurations.

16. The pool cleaner of claim 13, wherein the idler gear has:
a first circumferential position relative to the driven gear in the first configuration; and
a second circumferential position relative to the driven gear in the second configuration.

17. The pool cleaner of claim 13, wherein the first direction is a reverse direction and the second direction is a forward direction.

18. The pool cleaner of claim 13, wherein:
an inlet conduit extends vertically downward through the housing; and
an outlet conduit extends vertically upward through the housing.

19. The pool cleaner of claim 13, further comprising an outlet nozzle coupled to an outlet conduit and configured to eject pressurized water upward from the housing and into the pool in a parallel or oblique ejection direction relative to a vertical axis.

20. The pool cleaner of claim 13, further comprising a first floating body moveably coupled to a left side of the housing and a second floating body moveably coupled to a right side of the housing, the first and second floating bodies configured to move asymmetrically relative to a longitudinal axis of the pool cleaner.

21. A pool cleaner for use in a pool containing water and having a pump, the pool cleaner having a longitudinal axis, a transverse axis, and a vertical axis, the pool cleaner comprising:
a housing;
a driving assembly comprising:
an inlet conduit configured to receive pressurized water from the pump;
an impeller in fluid communication with the inlet conduit;
an outlet conduit in fluid communication with the impeller; and
an outlet nozzle coupled to the outlet conduit and configured to eject pressurized water in a vertically upward ejection direction from the housing and into the pool;
a transmission assembly comprising a gearset operable in a first configuration and a second configuration;
at least one traction assembly coupled to the transmission assembly to drive the housing in a first direction when the gearset is in the first configuration and a second direction when the gearset is in the second configuration; and
a filtration assembly disposed in the housing and configured to filter water from the pool.

22. The pool cleaner of claim 21 wherein the ejection direction further includes a rearward component that extends rearward from the housing, the vertically upward component generating a downward adhesion force and the rearward component generating a forward propulsion force.

23. A pool cleaner for use in a pool containing water, the pool cleaner having a longitudinal axis, a transverse axis, and a vertical axis, the pool cleaner comprising:
- a housing having a left side and a right side, the longitudinal axis of the pool cleaner extending between the left and right sides of the housing;
- a driving assembly;
- a transmission assembly coupled to the driving assembly;
- a left traction assembly coupled to the transmission assembly to drive the housing across the pool;
- a right traction assembly coupled to the transmission assembly to drive the housing across the pool;
- a filtration assembly disposed in the housing and configured to filter water from the pool;
- a left floating body moveably coupled to the left side of the housing; and
- a right floating body moveably coupled to the right side of the housing;
- wherein the left and right floating bodies are configured to move asymmetrically relative to the longitudinal axis of the pool cleaner.

24. The pool cleaner of claim 23, wherein the driving assembly comprises:
- an inlet conduit configured to receive pressurized water from a pump disposed externally of the pool;
- an impeller in fluid communication with the inlet conduit;
- an outlet conduit in fluid communication with the impeller; and
- an outlet nozzle coupled to the outlet conduit and configured to eject pressurized water in a vertically upward ejection direction from the housing and into the pool.

25. The pool cleaner of claim 23, wherein the transmission assembly comprises:
- a first gear coupled to the driving assembly;
- a second gear rotatable in an opposite direction than the first gear;
- an idler gear moveable between a first configuration in which the idler gear meshes with the first gear and a second configuration in which the idler gear meshes with the second gear; and
- a driven gear that meshes with the idler gear in the first and second configurations.

\* \* \* \* \*